US012325193B2

United States Patent
Shitrit et al.

(10) Patent No.: US 12,325,193 B2
(45) Date of Patent: *Jun. 10, 2025

(54) METHOD AND SYSTEM FOR ADDITIVE MANUFACTURING OF PEELABLE SACRIFICIAL STRUCTURE

(71) Applicant: Stratasys Ltd., Rehovot (IL)

(72) Inventors: Yaniv Shitrit, Ashkelon (IL); Eduardo Napadensky, Natania (IL)

(73) Assignee: Stratasys Ltd., Rehovot (IL)

( * ) Notice: Subject to any disclaimer, the term of this patent is extended or adjusted under 35 U.S.C. 154(b) by 42 days.

This patent is subject to a terminal disclaimer.

(21) Appl. No.: 18/111,625

(22) Filed: Feb. 20, 2023

(65) Prior Publication Data

US 2023/0191707 A1     Jun. 22, 2023

Related U.S. Application Data

(63) Continuation of application No. 16/618,133, filed as application No. PCT/IL2018/050590 on May 29, 2018, now Pat. No. 11,584,089.

(Continued)

(51) Int. Cl.
*B29C 64/40*     (2017.01)
*B29C 64/112*    (2017.01)
(Continued)

(52) U.S. Cl.
CPC .......... *B29C 64/40* (2017.08); *B29C 64/112* (2017.08); *B29C 64/209* (2017.08); *B33Y 10/00* (2014.12);
(Continued)

(58) Field of Classification Search
CPC ......... B33Y 10/00; B33Y 50/00; B33Y 80/00; B33Y 30/00; B29C 64/40; B29C 64/112
See application file for complete search history.

(56) References Cited

U.S. PATENT DOCUMENTS

| 5,503,785 A | 4/1996 | Crump et al. |
| 6,228,923 B1 | 5/2001 | Lombardi et al. |

(Continued)

FOREIGN PATENT DOCUMENTS

| CN | 1544231 | 11/2004 |
| CN | 1665877 | 9/2005 |

(Continued)

OTHER PUBLICATIONS

Office Action Dated Oct. 31, 2023 From the Israel Patent Office Re. Application No. 275711. (3 Pages).

(Continued)

*Primary Examiner* — Seyed Masoud Malekzadeh
*Assistant Examiner* — Debjani Roy

(57) ABSTRACT

A method of additive manufacturing of a three-dimensional object. The method comprises: sequentially dispensing and solidifying a plurality of layers comprising (i) a stack of model layers arranged in a configured pattern corresponding to the shape of the object and being made of a modeling material, (ii) a sacrificial structure having a stack of sacrificial layers made of an elastomeric material, and (iii) a stack of intermediate layers made of a support material having an elastic modulus less than the elastomeric material and being between the stack of model layers and the sacrificial structure; and applying a peeling force to the sacrificial structure to remove the sacrificial structure, and to expose the stack of model layers and/or the stack of intermediate layers beneath the sacrificial structure.

18 Claims, 15 Drawing Sheets

Related U.S. Application Data

(60) Provisional application No. 62/512,134, filed on May 29, 2017.

(51) Int. Cl.
    *B29C 64/209*     (2017.01)
    *B33Y 10/00*     (2015.01)
    *B33Y 30/00*     (2015.01)
    *B33Y 70/10*     (2020.01)
    *B29K 33/00*     (2006.01)
    *B29K 509/08*     (2006.01)

(52) U.S. Cl.
    CPC .............. *B33Y 30/00* (2014.12); *B33Y 70/10* (2020.01); *B29K 2033/12* (2013.01); *B29K 2509/08* (2013.01)

(56) References Cited

U.S. PATENT DOCUMENTS

| | | |
|---|---|---|
| 6,259,962 B1 | 7/2001 | Gothait |
| 6,569,373 B2 | 5/2003 | Napadensky |
| 6,658,314 B1 | 12/2003 | Gothait |
| 6,850,334 B1 | 2/2005 | Gothait |
| 7,104,773 B2 | 9/2006 | Maekawa et al. |
| 7,183,335 B2 | 2/2007 | Napadensky |
| 7,209,797 B2 | 4/2007 | Kritchman et al. |
| 7,225,045 B2 | 5/2007 | Gothait et al. |
| 7,255,825 B2 | 8/2007 | Nielsen et al. |
| 7,300,619 B2 | 11/2007 | Napadensky et al. |
| 7,479,510 B2 | 1/2009 | Napadensky et al. |
| 7,500,846 B2 | 3/2009 | Eshed et al. |
| 7,962,237 B2 | 6/2011 | Kritchman |
| 8,865,047 B2 | 10/2014 | Sella |
| 9,031,680 B2 | 5/2015 | Napadensky |
| 9,227,365 B2 | 1/2016 | Dikovsky et al. |
| 11,584,089 B2 * | 2/2023 | Shitrit .................. B29C 64/118 |
| 2002/0096112 A1 | 7/2002 | Coc |
| 2004/0187714 A1 * | 9/2004 | Napadensky ......... B29C 64/112 101/35 |
| 2005/0069784 A1 | 3/2005 | Gothait et al. |
| 2005/0124491 A1 | 6/2005 | Hopkins |
| 2005/0233130 A1 | 10/2005 | Grefenstein et al. |
| 2007/0168815 A1 | 7/2007 | Napadensky et al. |
| 2008/0121130 A1 | 5/2008 | Kritchman |
| 2010/0140850 A1 | 6/2010 | Napadensky et al. |
| 2010/0191360 A1 | 7/2010 | Napadensky et al. |
| 2012/0178845 A1 | 7/2012 | Napadensky et al. |
| 2012/0261848 A1 | 10/2012 | Haraszati |
| 2012/0308805 A1 * | 12/2012 | Sella ..................... B29C 64/112 428/222 |
| 2013/0011562 A1 | 1/2013 | Varanka |
| 2015/0151487 A1 | 6/2015 | Leighton et al. |
| 2015/0250971 A1 | 9/2015 | Bachelder et al. |
| 2016/0001505 A1 | 1/2016 | Hakkaku et al. |
| 2016/0100917 A1 | 4/2016 | Howe |
| 2016/0136903 A1 | 5/2016 | Herran et al. |
| 2016/0185050 A1 * | 6/2016 | Topolkaraev ......... B29C 64/118 425/375 |
| 2016/0355694 A1 | 12/2016 | Okamoto |
| 2017/0087775 A1 | 3/2017 | Sakai et al. |
| 2017/0136706 A1 | 5/2017 | Hakkaku |
| 2017/0151718 A1 * | 6/2017 | Rolland ............. C08G 18/4825 |
| 2017/0239886 A1 | 8/2017 | Norikane |
| 2018/0111316 A1 | 4/2018 | Schaufelberger et al. |
| 2018/0141241 A1 | 5/2018 | Staal et al. |
| 2018/0281294 A1 | 10/2018 | Gottschalk-Gaudic et al. |
| 2020/0198250 A1 | 6/2020 | Shitrit et al. |
| 2020/0331195 A1 | 10/2020 | Rumbak et al. |
| 2022/0031435 A1 | 2/2022 | Shitrit |
| 2024/0149521 A1 | 5/2024 | Rumbak et al. |

FOREIGN PATENT DOCUMENTS

| | | |
|---|---|---|
| CN | 1926470 | 3/2007 |
| CN | 102037064 | 4/2011 |
| CN | 103347682 | 10/2013 |
| CN | 103568325 | 2/2014 |
| CN | 204894515 | 12/2015 |
| CN | 105582571 | 5/2016 |
| CN | 105637035 | 6/2016 |
| CN | 106045503 | 10/2016 |
| CN | 106458659 | 2/2017 |
| CN | 106515000 | 3/2017 |
| CN | 106660266 | 5/2017 |
| EP | 2150077 | 2/2010 |
| EP | 3002110 | 4/2016 |
| EP | 3053728 | 8/2016 |
| EP | 3064193 | 9/2016 |
| JP | 07-195530 | 8/1995 |
| JP | 2004-255839 | 9/2004 |
| JP | 2010-537720 | 12/2010 |
| JP | 2015-038166 | 2/2015 |
| JP | 2015-123743 | 7/2015 |
| JP | 2015-131469 | 7/2015 |
| JP | 2015-136915 | 7/2015 |
| JP | 2015-168202 | 9/2015 |
| JP | 2016-26915 | 2/2016 |
| JP | 2016-078284 | 5/2016 |
| JP | 2017-043041 | 3/2017 |
| WO | WO 2009/032228 | 3/2009 |
| WO | WO 2015/105047 | 7/2015 |
| WO | WO 2016/125816 | 8/2016 |
| WO | WO 2018/220632 | 12/2018 |
| WO | WO 2019/130292 | 7/2019 |
| WO | WO 2018/220632 A9 | 3/2020 |
| WO | WO 2020/065653 | 4/2020 |

OTHER PUBLICATIONS

Official Action Dated May 25, 2023 from the US Patent and Trademark Office Re. U.S. Appl. No. 16/914,392. (26 pages).

Notice of Allowance Dated Oct. 4, 2023 together with Interview Summary Dated Sep. 26, 2023 from the US Patent and Trademark Office Re. U.S. Appl. No. 16/914,392. (12 pages).

Communication Pursuant to Article 94(3) EPC Dated Apr. 5, 2022 From the European Patent Office Re. Application No. 18819471.6. (3 Pages).

Communication Pursuant to Article 94(3) EPC Dated Jul. 7, 2020 From the European Patent Office Re. Application No. 18739649.4. (3 Pages).

Communication Pursuant to Article 94(3) EPC Dated Apr. 26, 2021 From the European Patent Office Re. Application No. 18819471.6. (7 Pages).

Decision of Rejection Dated Mar. 16, 2022 From the State Intellectual Property Office of the People's Republic of China Re. Application No. 201880046410.6 and Its English Summary. (8 Pages).

Decision to Grant Dated Aug. 30, 2022 From the Japan Patent Office Re. Application No. 2021-071914 and Its Translation Into English (6 Pages).

Final Official Action Dated Sep. 13, 2021 from the US Patent and Trademark Office Re. U.S. Appl. No. 16/618,133. (22 pages).

Grounds of Reasons for Rejection Dated Mar. 3, 2020 From the Korean Patent Office Re. Application No. 10-2019-7038817 and Its Translation Into English. (12 Pages).

Grounds of Reasons for Rejection Dated Aug. 21, 2020 From the Korean Patent Office Re. Application No. 10-2019-7038817 and Its Translation Into English. (5 Pages).

International Preliminary Report on Patentability Dated Apr. 8, 2021 From the International Bureau of WIPO Re. Application No. PCT/IL2019/051067. (8 Pages).

International Preliminary Report on Patentability Dated Jul. 9, 2020 From the International Bureau of WIPO Re. Application No. PCT/IL2018/051296. (13 Pages).

International Preliminary Report on Patentability Dated Dec. 12, 2019 From the International Bureau of WIPO Re. Application No. PCT/IL2018/050590. (10 Pages).

(56) References Cited

OTHER PUBLICATIONS

International Search Report and the Written Opinion Dated Feb. 6, 2020 From the International Searching Authority Re. Application No. PCT/IL2019/051067. (12 Pages).
International Search Report and the Written Opinion Dated Mar. 8, 2019 From the International Searching Authority Re. Application No. PCT /IL2018/051296. (20 Pages).
International Search Report and the Written Opinion Dated Oct. 12, 2018 From the International Searching Authority Re. Application No. PCT/IL2018/050590. (17 Pages).
Notice of Allowance Dated Oct. 4, 2022 from US Patent and Trademark Office Re. U.S. Appl. No. 16/618,133. (18 pages).
Notice of Reason for Rejection Dated Nov. 27, 2020 From the Japan Patent Office Re. Application No. 2019-566114 and Its Translation Into English. (5 Pages).
Notice of Reason for Rejection Dated Jun. 30, 2020 From the Japan Patent Office Re. Application No. 2019-566114 and Its Translation Into English. (11 Pages).
Notice of Reason(s) for Rejection Dated Oct. 21, 2022 From the Japan Patent Office Re. Application No. 2021-517020 and Its Translation Into English. (6 pages).
Notice of Reasons for Rejection Dated Jun. 24, 2022 From the Japan Patent Office Re. Application No. 2020-536689 and Its Translation Into English. (6 Pages).
Notice of Reasons for Rejection Dated Feb. 25, 2022 From the Japan Patent Office Re. Application No. 2021-71914 and Its Translation Into English. (9 Pages).
Notification of Office Action and Search Report Dated Apr. 8, 2022 From the State Intellectual Property Office of the People's Republic of China Re. Application No. 201980061346.3 and Its Translation of Office Action Into English. (9 Pages).
Notification of Office Action and Search Report Dated Sep. 24, 2021 From the State Intellectual Property Office of the People's Republic of China Re. Application No. 201880088471.9 and Its English Summary. (13 Pages).
Notification of Office Action and Search Report Dated Mar. 25, 2021 From the State Intellectual Property Office of the People's Republic of China Re. Application No. 201880046410.6 and Its Translation of Office Action Into English. (14 Pages).
Notification of Office Action and Search Report Dated Sep. 28, 2020 From the State Intellectual Property Office of the People's Republic of China Re. Application No. 201880046410.6 and Its Translation of Office Action Into English. (9 Pages).
Notification of Office Action Dated Sep. 1, 2022 From the State Intellectual Property Office of the People's Republic of China Re. Application No. 201880088471.9. (5 Pages).
Notification of Office Action Dated Apr. 13, 2022 From the State Intellectual Property Office of the People's Republic of China Re. Application No. 201880088471.9 and Its Translation Into English. (9 Pages).
Notification of Office Action Dated Dec. 15, 2021 From the State Intellectual Property Office of the People's Republic of China Re. Application No. 201880046410.6. (7 Pages).
Notification of Office Action Dated Aug. 23, 2021 From the State Intellectual Property Office of the People's Republic of China Re. Application No. 201880046410.6. (6 Pages).
Office Action Dated May 9, 2021 From the Israel Patent Office Re. Application No. 278176 and Its Translation Into English. (7 Pages).
Office Action Dated Mar. 29, 2020 From the Israel Patent Office Re. Application No. 270998 and Its Tranlation Into English. (5 Pages).
Official Action Dated Nov. 10, 2022 from the US Patent and Trademark Office Re. U.S. Appl. No. 16/914,392. (78 pages).
Official Action Dated Nov. 13, 2020 from the US Patent and Trademark Office Re. U.S. Appl. No. 16/618,133. (36 pages).
Official Action Dated Aug. 25, 2022 from US Patent and Trademark Office Re. U.S. Appl. No. 17/279,762. (42 pages).
Official Action Dated Mar. 26, 2021 from the US Patent and Trademark Office Re. U.S. Appl. No. 16/618,133. (19 pages).
Official Action Dated May 31, 2022 from US Patent and Trademark Office Re. U.S. Appl. No. 16/618,133. (34 pages).
Restriction Official Action Dated Aug. 17, 2022 from US Patent and Trademark Office Re. U.S. Appl. No. 16/914,392. (12 pages).
Restriction Official Action Dated Jun. 29, 2022 from US Patent and Trademark Office Re. U.S. Appl. No. 17/279,762. (8 pages).
Translation Dated Sep. 8, 2021 of Notification of Office Action Dated Aug. 23, 2021 From the State Intellectual Property Office of the People's Republic of China Re. Application No. 201880046410.6. (8 Pages).
Translation Dated Apr. 18, 2022 of Decision of Rejection Dated Mar. 16, 2022 From the State Intellectual Property Office of the People's Republic of China Re. Application No. 201880046410.6. (8 Pages).
Translation of Notification of Office Action Dated Sep. 1, 2022 From the State Intellectual Property Office of the People's Republic of China Re. Application No. 201880088471.9. (5 Pages).
Simplify 3D "Rafts, Skirts and Brimes", Simplify 3D, 7 P., Retrieved from Internet on Sep. 6, 2016.
Notice of Allowance Dated Jun. 15, 2023 from the US Patent and Trademark Office Re. U.S. Appl. No. 17/279,762. (8 pages).
Final Official Action Dated Mar. 2, 2023 From the US Patent and Trademark Office Re. U.S. Appl. No. 17/279,762. (25 Pages).

* cited by examiner

METHOD AND SYSTEM FOR ADDITIVE MANUFACTURING OF PEELABLE SACRIFICIAL STRUCTURE

RELATED APPLICATIONS

This application is a Continuation of U.S. patent application Ser. No. 16/618,133, filed on Nov. 28, 2019, now issued as U.S. Pat. No. 11,584,089, which is a National Phase of PCT Patent Application No. PCT/IL2018/050590 having International Filing Date of May 29, 2018, which claims the benefit of priority of U.S. Provisional Patent Application No. 62/512,134 filed on May 29, 2017. PCT Patent Application No. PCT/IL2018/050590 is also related to U.S. Provisional Patent Application No. 62/512,134 filed on May 29, 2017, which in turn was co-filed with PCT Patent Application No. PCT/IL2017/050604 having International Filing Date of May 29, 2017, which claims the benefit of priority of U.S. Provisional Patent Application No. 62/342,970 filed on May 29, 2016. The contents of all of the above applications are incorporated herein by reference in their entirety.

FIELD AND BACKGROUND OF THE INVENTION

The present invention, in some embodiments thereof, relates to additive manufacturing (AM), and, more particularly, but not exclusively, to method and system for additive manufacturing of peelable sacrificial structure.

Additive manufacturing (AM) is a technology enabling fabrication of arbitrarily shaped structures directly from computer data via additive formation steps. The basic operation of any AM system consists of slicing a three-dimensional computer model into thin cross sections, translating the result into two-dimensional position data and feeding the data to control equipment which fabricates a three-dimensional structure in a layerwise manner.

Additive manufacturing entails many different approaches to the method of fabrication, including three-dimensional (3D) printing such as 3D inkjet printing, electron beam melting, stereolithography, selective laser sintering, laminated object manufacturing, fused deposition modeling and others. 3D printing processes, for example, 3D inkjet printing, are being performed by a layer by layer inkjet deposition of building materials. Thus, a building material is dispensed from a dispensing head having a set of nozzles to deposit layers on a supporting structure. Depending on the building material, the layers may then be cured or solidified using a suitable device. Various three-dimensional printing techniques exist and are disclosed in, e.g., U.S. Pat. Nos. 6,259,962, 6,569,373, 6,658,314, 6,850,334, 6,863, 859, 7,183,335, 7,209,797, 7,225,045, 7,300,619, 7,500,846 and 9,031,680, all by the same Assignee, and being hereby incorporated by reference in their entirety.

The building material of a typical AM process, includes a model material (also referred to as "modeling material"), which is deposited to produce the desired object, and a support material (also referred to as "supporting material") which provides temporary support to specific regions of the object during building and for assuring adequate vertical placement of subsequent object layers. For example, in cases where objects include overhanging features or shapes, e.g., curved geometries, negative angles, voids, and the like, objects are typically constructed using adjacent support constructions, which are used during the printing and then subsequently removed in order to reveal the final shape of the fabricated object.

Known methods for removal of support materials include water-jet impact, chemical methods, such as dissolution in a solvent, oftentimes in combination with thermal treatment. For example, for water soluble support material, the fabricated object, including its support structure, is immersed in water capable of dissolving the support material.

Support materials for AM are described, for example, in U.S. Pat. Nos. 6,228,923, 7,255,825, 7,479,510, 7,183,335 and 6,569,373, all to the present Assignee and being incorporated by reference in their entirety.

U.S. Pat. No. 8,865,047, assigned to the present Assignee and being incorporated by reference in its entirety, discloses a method of constructing a support construction in which the support construction includes a strip that intersects the layers in a volume designed to be an empty space in the 3D object. The support construction is removed from the volume by application of a lifting force on the strip.

SUMMARY OF THE INVENTION

According to an aspect of some embodiments of the present invention there is provided a method of additive manufacturing of a three-dimensional object. The method comprises: sequentially dispensing and solidifying a plurality of layers comprising (i) a stack of model layers arranged in a configured pattern corresponding to the shape of the object and being made of a modeling material, (ii) a sacrificial structure having a stack of sacrificial layers made of an elastomeric material, and (iii) a stack of intermediate layers made of a support material having an elastic modulus less than the elastomeric material and being between the stack of model layers and the sacrificial structure; and applying a peeling force to the sacrificial structure (e.g., in dry environment) to remove the sacrificial structure, and to expose the stack of model layers and/or the stack of intermediate layers beneath the sacrificial structure.

According to an aspect of some embodiments of the present invention there is provided a system for fabricating a three-dimensional object by additive manufacturing. The system comprises: a plurality of dispensing heads, having at least a first dispensing head configured for dispensing a modeling material, a second dispensing head configured for dispensing an elastomeric material, and a third dispensing head configured for dispensing a support material having an elastic modulus less than the elastomeric material; a solidification system configured for solidifying each of the materials; and a computerized controller having a circuit configured for operating the dispensing heads and solidification system to sequentially dispense and solidify the plurality of layers as delineated above and optionally and preferably as further detailed and exemplified below.

According to some of any of the embodiments of the invention described herein a plurality of stacks of model layers are dispensed, wherein each stack is arranged in a configured pattern corresponding to the shape of a separate object and being made of a modeling material, thereby forming a plurality of objects on single receiving surface.

According to some of any of the embodiments of the invention described herein the sacrificial structure and the intermediate layers are dispensed collectively on at least two stacks of model layers such as to form a single peelable sacrificial structure covering the at least two stacks of model layers.

According to some of any of the embodiments of the invention described herein the support material is dispensed directly on a tray or a disposable medium placed on the tray to form a pedestal at least partially coating the tray or disposable medium, wherein at least a portion of the sacrificial structure is dispensed on the pedestal.

According to some of any of the embodiments of the invention described herein the pedestal partially coats the tray or disposable medium, and the stack of model layers is dispensed directly on the tray or a disposable medium but not on the pedestal, wherein the pedestal, the sacrificial structure and the intermediate layers are selected such that adhesive forces between the sacrificial structure and the stack of model layer are lower than adhesive forces between the stack of model layer and the tray or a disposable medium.

According to some of any of the embodiments of the invention described herein a thickness of the stack of intermediate layer is from about 200 microns to about 300 microns, more preferably from about 210 microns to about 290 microns, more preferably from about 220 microns to about 280 microns, e.g., about 250 microns.

According to some of any of the embodiments of the invention described herein the sacrificial structure is characterized, once solidified, by a tear resistance of at least 4 kN per meter, when measured according to international standard ASTM D-624, once solidified.

According to some of any of the embodiments of the invention described herein the sacrificial structure is characterized, once solidified, by a tear resistance of from about 4 kN per meter to about 8 kN per meter, more preferably from about 5 kN per meter to about 7 kN per meter, when measured according to international standard ASTM D-624.

According to some of any of the embodiments of the invention described herein a magnitude of the peeling force is from about 1 N to about 20 N, e.g., about 10 N.

According to an aspect of some embodiments of the present invention there is provided a method of additive manufacturing of a three-dimensional object. The method comprises: sequentially dispensing and solidifying a plurality of layers comprising (i) a stack of model layers arranged in a configured pattern corresponding to the shape of the object and being made of a modeling material, and (ii) a layered sacrificial structure formed of interlaced slices of support material and modeling material; and applying a peeling force to the sacrificial structure (e.g., in dry environment) to remove the sacrificial structure, and to expose the stack of model layers beneath the stack of sacrificial layers.

According to an aspect of some embodiments of the present invention there is provided a system for fabricating a three-dimensional object by additive manufacturing. The system comprises: a plurality of dispensing heads, having at least a first dispensing head configured for dispensing a modeling material, and a second dispensing head configured for dispensing a support material; a solidification system configured for solidifying each of the materials; and a computerized controller having a circuit configured for operating the dispensing heads and solidification system to sequentially dispense and solidify a plurality of layers as delineated above and optionally and preferably as further detailed and exemplified below.

According to an aspect of some embodiments of the present invention there is provided a computer software product. The computer software product comprises a computer-readable medium in which program instructions are stored, which instructions, when read by a computerized controller of an additive manufacturing system, cause the system to sequentially dispense and solidify a plurality of layers as delineated above and optionally and preferably as further detailed and exemplified below.

According to some of any of the embodiments of the invention described herein a plurality of stacks of model layers are dispensed, wherein each stack is arranged in a configured pattern corresponding to the shape of a separate object and being made of a modeling material, thereby forming a plurality of objects on single receiving surface.

According to some of any of the embodiments of the invention described herein the sacrificial structure is dispensed collectively on at least two stacks of model layers such as to form a single peelable sacrificial structure covering the at least two stacks of model layers.

According to some of any of the embodiments of the invention described herein the support material is dispensed directly on a tray or a disposable medium placed on the tray to form a pedestal at least partially coating the tray or disposable medium, wherein at least a portion of the sacrificial structure is dispensed on the pedestal.

According to some of any of the embodiments of the invention described herein the pedestal partially coats the tray or disposable medium, and the stack of model layers is dispensed directly on the tray or a disposable medium but not on the pedestal, wherein the pedestal and the sacrificial structure are selected such that adhesive forces between the sacrificial structure and the stack of model layer are lower than adhesive forces between the stack of model layer and the tray or a disposable medium.

According to some of any of the embodiments of the invention described herein the modeling material of the stack of model layers and the modeling material of the sacrificial structure are the same modeling material.

According to some of any of the embodiments of the invention described herein a thickness of a slice of support material adjacent to the stack of model layers is from about 200 microns to about 300 microns, more preferably from about 210 microns to about 290 microns, more preferably from about 220 microns to about 280 microns, e.g., about 250 microns.

According to some of any of the embodiments of the invention described herein the plurality of layers comprises a stack of intermediate layers between the layered sacrificial structure and the stack of model layers. According to some of any of the embodiments of the invention described herein the stack of intermediate layers has a thickness from about 200 microns to about 300 microns, more preferably from about 210 microns to about 290 microns, more preferably from about 220 microns to about 280 microns, e.g., about 250 microns.

According to some of any of the embodiments of the invention described herein a height of a slice of modeling material in the sacrificial structure is from about 250 microns to about 4 mm, or from about 1 mm to about 2 mm.

According to some of any of the embodiments of the invention described herein a slice of support material adjacent to the stack of model layers is thicker than any other slice of support material.

According to some of any of the embodiments of the invention described herein a thickness of the sacrificial structure is selected such that a peeling force of about 5 N results in a bending strain of at least 0.02, more preferably at least 0.022, more preferably 0.024, more preferably 0.026.

According to some of any of the embodiments of the invention described herein a magnitude of the peeling force is from about 1 N to about 10 N, e.g., about 5 N.

According to some of any of the embodiments of the invention described herein a minimal thickness of the sacrificial structure is from about 500 microns to about 3 mm, more preferably from about 500 microns to about 2.5 mm, more preferably from about 500 microns to about 2 mm.

According to some embodiments of the invention, for at least one of the stack of model layers and the layered sacrificial structure, a flexural modulus of the modeling material is from about 2000 MPa to about 4000 MPa, more preferably from about 2000 MPa to about 3500 MPa, from about 2200 MPa to about 3200 MPa, when measured according to international standard ASTM D-790-04.

According to some of any of the embodiments of the invention described herein the stack of model layers fills a cavity partially enclosed by the sacrificial structure.

According to some of any of the embodiments of the invention described herein the stack of model layers fills a cavity fully enclosed by the sacrificial structure.

According to some of any of the embodiments of the invention described herein the stack of model layers is shaped to form an artificial dental structure.

According to some of any of the embodiments of the invention described herein the sacrificial structure fills a cavity partially enclosed by the stack of model layers.

According to some of any of the embodiments of the invention described herein the method comprises, following the removal of the sacrificial structure, placing a foreign element in the cavity.

According to some of any of the embodiments of the invention described herein the elastomeric material is a formulation comprising silica particles.

According to some of any of the embodiments of the invention described herein, the formulation comprises silica particles.

According to some of any of the embodiments of the invention described herein, the silica particles have an average particle size lower than 1 micron.

According to some of any of the embodiments of the invention described herein, at least a portion of the silica particles feature a hydrophilic surface.

According to some of any of the embodiments of the invention described herein, at least a portion of the silica particles feature a hydrophobic surface.

According to some of any of the embodiments of the invention described herein, at least a portion of the silica particles comprise functionalized silica particles.

According to some of any of the embodiments of the invention described herein, at least a portion of the silica particles are functionalized by curable functional groups (e.g., (meth)acrylate groups).

According to some of any of the embodiments of the invention described herein, an amount of the silica particles in the formulation ranges from about 1% to about 20%, or from about 1% to about 15%, or from about 1% to about 10%, by weight, of the total weight of the formulation.

According to some of any of the embodiments of the invention described herein, an amount of the silica particles in the modeling material formulation ranges from about 1% to about 20%, or from about 1% to about 15%, or from about 1% to about 10%, by weight, of the total weight of the formulation.

According to some of any of the embodiments of the invention described herein, a weight ratio of the elastomeric material and the silica particles ranges from about 30:1 to about 4:1.

According to some of any of the embodiments of the invention described herein, an amount of the elastomeric material is at least 40%, or at last 50%, by weight, of a total weight of the formulation.

According to some of any of the embodiments of the invention described herein, an amount of the elastomeric material is at least 40%, or at last 50%, by weight, of a total weight of the formulation.

According to some of any of the embodiments of the invention described herein, the elastomeric material is selected from mono-functional elastomeric monomer, mono-functional elastomeric oligomer, multi-functional elastomeric monomer, multi-functional elastomeric oligomer, and any combination thereof.

According to some of any of the embodiments of the invention described herein, the formulation further comprises at least one additional curable material.

According to some of any of the embodiments of the invention described herein, the additional curable material is selected from a mono-functional curable monomer, a mono-functional curable oligomer, a multi-functional curable monomer, a multi-functional curable oligomer and any combination thereof.

According to some of any of the embodiments of the invention described herein, the at least one modeling material formulation further comprises at least one additional, non-curable material, for example, one or more of a colorant, an initiator, a dispersant, a surfactant, a stabilizer and an inhibitor.

According to some of any of the embodiments of the invention described herein, the elastomeric material is a UV-curable elastomeric material.

According to some of any of the embodiments of the invention described herein, the elastomeric material is an acrylic elastomer.

According to some of any of the embodiments of the invention described herein, the formulation is characterized, when hardened, by a tear resistance which is higher by at least 0.5 kN per meter than, a solidified formulation having the same elastomeric material but devoid of the silica particles.

According to some of any of the embodiments of the invention described herein, the formulation comprises at least one elastomeric mono-functional curable material, at least one elastomeric multi-functional curable material and at least additional mono-functional curable material.

According to some of any of the embodiments of the invention described herein, a total concentration of the curable mono-functional material ranges from 10% to 30%, by weight of the total weight of the formulation.

According to some of any of the embodiments of the invention described herein, a total concentration of the elastomeric mono-functional curable material ranges from 50% to 70%, by weight of the total weight of the formulation.

According to some of any of the embodiments of the invention described herein, a total concentration of the elastomeric multi-functional curable material ranges from 10% to 20%, by weight, of the total weight of the formulation.

According to some of any of the embodiments of the invention described herein, a total concentration of the curable mono-functional material ranges from 10% to 30%, by weight; a total concentration of the elastomeric mono-functional curable material ranges from 50% to 70%, by weight; and a total concentration of the elastomeric multifunctional curable material ranges from 10% to 20%, by weight, of the total weight of the formulation.

According to some of any of the embodiments of the invention described herein, a total concentration of the curable mono-functional material ranges from 20% to 30%, by weight, of the total weight of the formulation.

According to some of any of the embodiments of the invention described herein, a total concentration of the elastomeric mono-functional curable material ranges from 30% to 50%, by weight, of the total weight of the formulation.

According to some of any of the embodiments of the invention described herein, a total concentration of the elastomeric multi-functional curable material ranges from 10% to 30%, by weight, of the total weight of the formulation.

According to some of any of the embodiments of the invention described herein, a total concentration of the curable mono-functional material ranges from 20% to 30%, by weight; a total concentration of the elastomeric mono-functional curable material ranges from 30% to 50%, by weight; and a total concentration of the elastomeric multi-functional curable material ranges from 10% to 30%, by weight, of the total weight of the formulation.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions.

Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
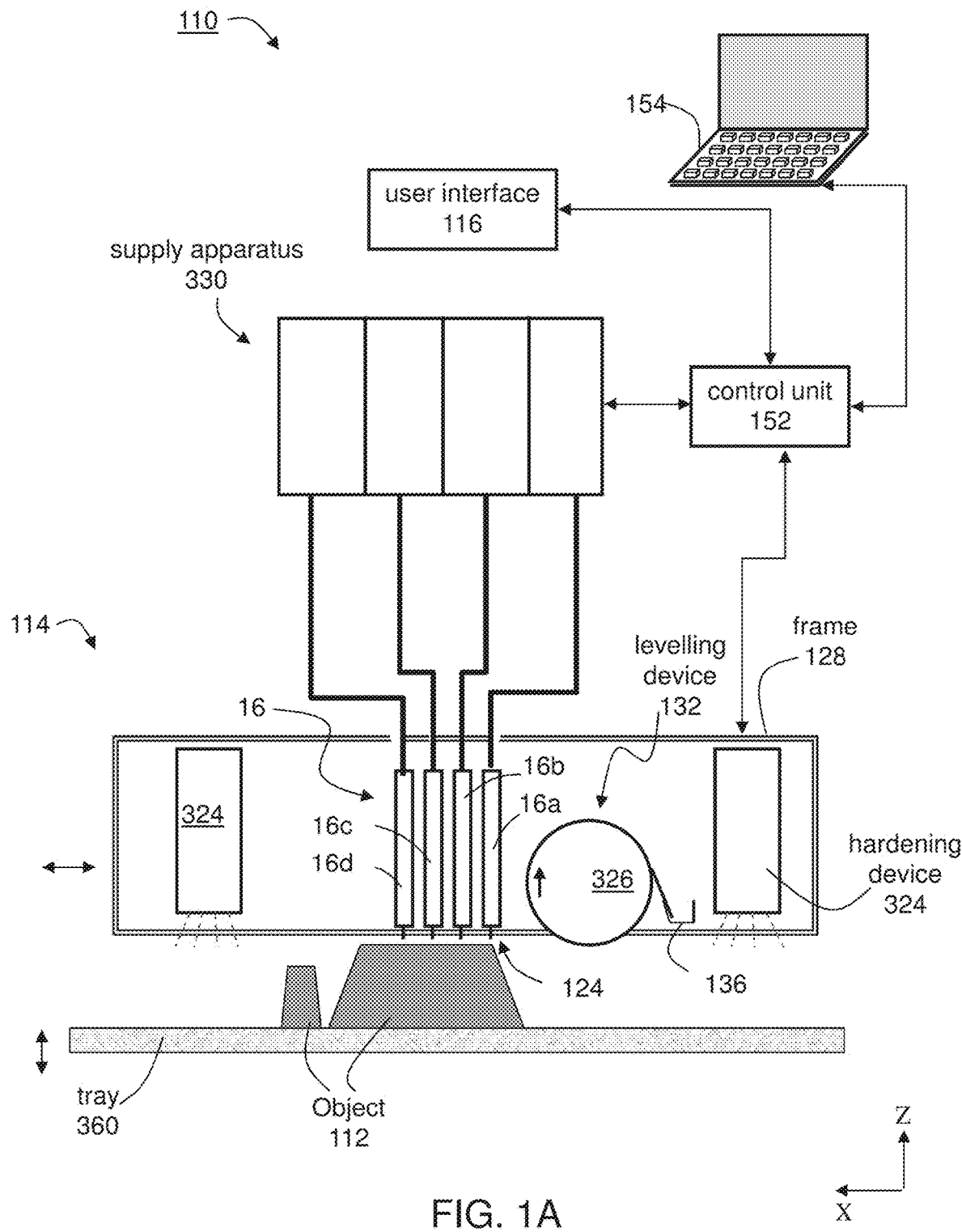
FIGS. 1A-1D are schematic illustrations of an additive manufacturing system according to some embodiments of the invention.

The present invention, in some embodiments thereof, relates to additive manufacturing (AM), and, more particularly, but not exclusively, to method and system for additive manufacturing of peelable sacrificial structure.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

The term "object" as used herein refers to a whole object or a part thereof. The term "object" describes a final product of the additive manufacturing. This term refers to the product obtained by a method as described herein, after removal of the support material, if such has been used as part of the building material. The "object" therefore essentially consists (at least 95 weight percents) of a hardened (e.g., cured) modeling material.

Each layer is formed by additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material, and which type of building material is to be delivered thereto. The decision is made according to a computer image of the surface.

In preferred embodiments of the present invention the AM comprises three-dimensional printing, more preferably three-dimensional inkjet printing. In these embodiments a building material is dispensed from a dispensing head having a set of nozzles to deposit building material in layers on a supporting structure. The AM apparatus thus dispenses building material in target locations which are to be occupied and leaves other target locations void. The apparatus typically includes a plurality of dispensing heads, each of which can be configured to dispense a different building material. Thus, different target locations can be occupied by different building materials. The types of building materials can be categorized into two major categories: modeling material and support material. The support material serves as a supporting matrix or construction for supporting the object or object parts during the fabrication process and/or other purposes, e.g., providing hollow or porous objects. Support constructions may additionally include modeling material elements, e.g. for further support strength.

The modeling material is generally a composition which is formulated for use in additive manufacturing and which is optionally and preferably able to form a three-dimensional object on its own, i.e., without having to be mixed or combined with any other substance.

The final three-dimensional object is made of the modeling material or a combination of two or more modeling materials, or a combination of modeling and support materials, or modification thereof (e.g., following solidification, such as, but not limited to, curing). All these operations are well-known to those skilled in the art of solid freeform fabrication.

In some embodiments of the invention an object is manufactured by dispensing two or more different modeling materials, each material from a different dispensing head of the AM. However, this need not necessarily be the case, since, for in some embodiments it may not be necessary to dispense more than one modeling material. In these embodiments, an object is manufactured by dispensing a single modeling material, and optionally and preferably a single support material. These embodiments are particularly preferred when the object is manufactured by a system that includes only one modeling material dispensing head and one support material dispensing head. These embodiments are also preferred when is manufactured by a system that includes two or more modeling material dispensing heads and one support material dispensing head, but it is desired to operate the system in a high throughput mode, wherein all the modeling material dispensing heads receive and dispense the same modeling material.

The material(s) are optionally and preferably deposited in layers during the same pass of the printing heads. The material(s) and combination of materials within the layer can be selected according to the desired properties of the object.

Figure 2A:
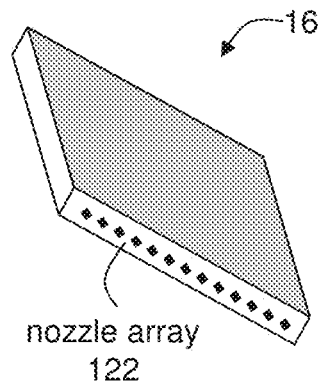
FIGS. 2A-2C are schematic illustrations of printing heads according to some embodiments of the present invention.
Figure 2B:
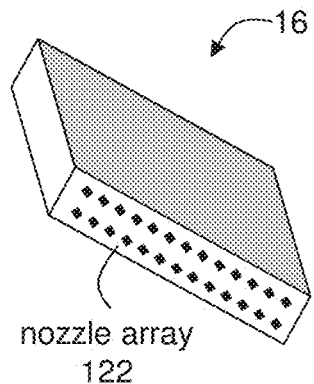
Figure 2C:
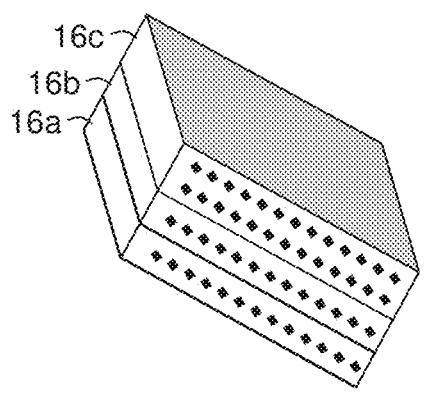

A representative and non-limiting example of a system 110 suitable for AM of an object 112 according to some embodiments of the present invention is illustrated in FIG. 1A. System 110 can comprise an additive manufacturing apparatus 114 having a dispensing unit 16 which comprises a plurality of dispensing heads. Each head preferably comprises an array of one or more nozzles 122, as illustrated in FIGS. 2A-C described below, through which a liquid building material 124 is dispensed.

Preferably, but not obligatorily, apparatus 114 is a three-dimensional printing apparatus, in which case the dispensing heads are printing heads, and the building material is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material deposition apparatus.

Each dispensing head is optionally and preferably fed via a building material reservoir which may optionally include a temperature controller (e.g., a temperature sensor and/or a heating device), and a material level sensor. To dispense the building material, a voltage signal is applied to the dispensing heads to selectively deposit droplets of material via the dispensing head nozzles, for example, as in piezoelectric inkjet printing technology. The dispensing rate of each head depends on the number of nozzles, the type of nozzles and the applied voltage signal rate (frequency). Such dispensing heads are known to those skilled in the art of solid freeform fabrication.

Preferably, but not obligatorily, the overall number of dispensing nozzles or nozzle arrays is selected such that half of the dispensing nozzles are designated to dispense support material and half of the dispensing nozzles are designated to dispense modeling material, i.e. the number of nozzles jetting modeling materials is the same as the number of nozzles jetting support material. In the representative example of FIG. 1A, four dispensing heads 16a, 16b, 16c and 16d are illustrated. Each of heads 16a, 16b, 16c and 16d has a nozzle array. In this Example, heads 16a and 16b can be designated for modeling material(s) and heads 16c and 16d can be designated for support material. Thus, head 16a can dispense a first modeling material, head 16b can dispense a second modeling material and heads 16c and 16d can both dispense support material. In an alternative embodiment, heads 16c and 16d, for example, may be combined in a single head having two nozzle arrays for depositing support material. In another alternative embodiment, heads 16a and 16b, may both dispense the same modeling material, or be combined in a single head having two nozzle arrays for depositing a modeling material. In another alternative embodiment, dispensing unit 16 comprises only head 16a (for dispensing a modeling material) and 16c (for dispensing a support material), and system 110 does not include any additional dispensing head other than heads 16a and 16c.

Yet it is to be understood that it is not intended to limit the scope of the present invention and that the number of modeling material depositing heads (modeling heads) and the number of support material depositing heads (support heads) may differ. Generally, the number of modeling heads, the number of support heads and the number of nozzles in each respective head or head array are selected such as to provide a predetermined ratio, a, between the maximal dispensing rate of the support material and the maximal dispensing rate of modeling material. The value of the predetermined ratio, a, is preferably selected to ensure that in each formed layer, the height of modeling material equals the height of support material. Typical values for a are from about 0.6 to about 1.5.

As used herein the term "about" refers to ±10%.

For example, for a=1, the overall dispensing rate of support material is generally the same as the overall dispensing rate of the modeling material when all modeling heads and support heads operate.

In a preferred embodiment, there are M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature controller and a material level sensor of its own, and receives an individually controlled voltage for its operation.

Apparatus 114 can further comprise a solidification system 324 which can include any device configured to emit light, heat or the like that may cause the deposited material to solidify and optionally and preferably harden. For example, solidification system 324 can comprise one or more radiation sources, which can be, for example, an ultraviolet or visible or infrared lamp, or other sources of electromagnetic radiation, or electron beam source, depending on the modeling material being used. In some embodiments of the present invention, solidification system 324 serves for curing or solidifying the modeling material.

The dispensing heads and radiation source are preferably mounted on a frame or block 128 which is preferably operative to reciprocally move over a tray 360, which serves as the working surface. In some embodiments of the present invention the radiation sources are mounted in the block such that they follow in the wake of the dispensing heads to at least partially solidify (e.g., cure) the materials just dispensed by the dispensing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material generated during leveling. Waste collection device 136 may comprise any mechanism that delivers the material to a waste tank or waste cartridge.

In use, the dispensing heads of unit 16 move in a scanning direction, which is referred to herein as the X direction, and selectively dispense building material in a predetermined configuration in the course of their passage over tray 360. The building material typically comprises one or more types of support material and one or more types of modeling material. The passage of the dispensing heads of unit 16 is followed by the curing of the modeling material(s) by radiation source 126. In the reverse passage of the heads, back to their starting point for the layer just deposited, an additional dispensing of building material may be carried out, according to predetermined configuration. In the forward and/or reverse passages of the dispensing heads, the layer thus formed may be straightened by leveling device 326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction.

Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the dispensing head of unit 16, within the layer. Such Z displacement is carried out in order to cause contact of the leveling device with the surface in one direction and prevent contact in the other direction.

System 110 optionally and preferably comprises a building material supply system 330 which comprises the building material containers or cartridges and supplies a plurality of building materials to fabrication apparatus 114.

A computerized controller 340 controls fabrication apparatus 114 and optionally and preferably also supply system 330. Controller 340 typically includes an electronic circuit configured to perform the controlling operations. Controller 340 preferably communicates with a data processor 154 which transmits digital data pertaining to fabrication instructions based on computer object data, e.g., a CAD configuration represented on a computer readable medium in any of the aforementioned formats (e.g., STL). Typically, controller 340 controls the voltage applied to each dispensing head or nozzle array and the temperature of the building material in the respective printing head.

Once the manufacturing data is loaded to controller 340 it can operate without user intervention. In some embodiments, controller 340 receives additional input from the operator, e.g., using data processor 154 or using a user interface 116 communicating with unit 340. User interface 116 can be of any type known in the art, such as, but not limited to, a keyboard, a touch screen and the like. For example, controller 340 can receive, as additional input, one or more building material types and/or attributes, such as, but not limited to, color, characteristic distortion and/or transition temperature, viscosity, electrical property, magnetic property. Other attributes and groups of attributes are also contemplated.

Figure 1B:
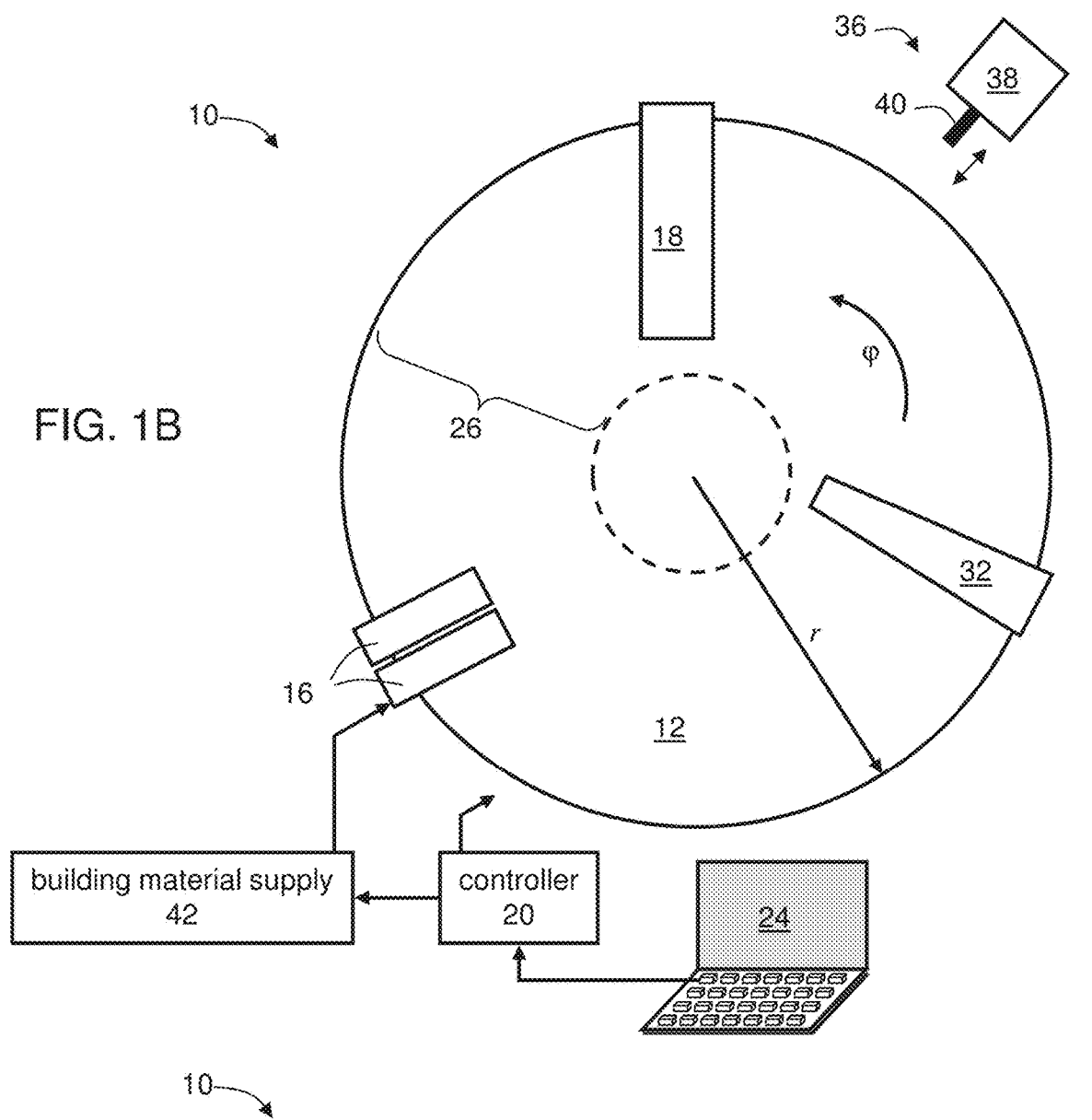
Figure 1C:
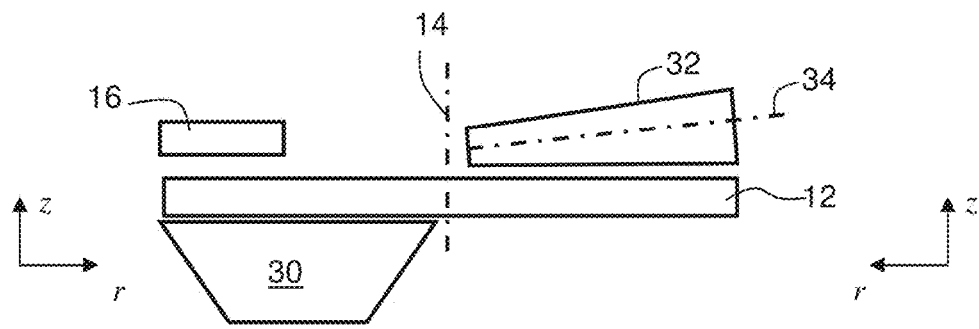
Figure 1D:
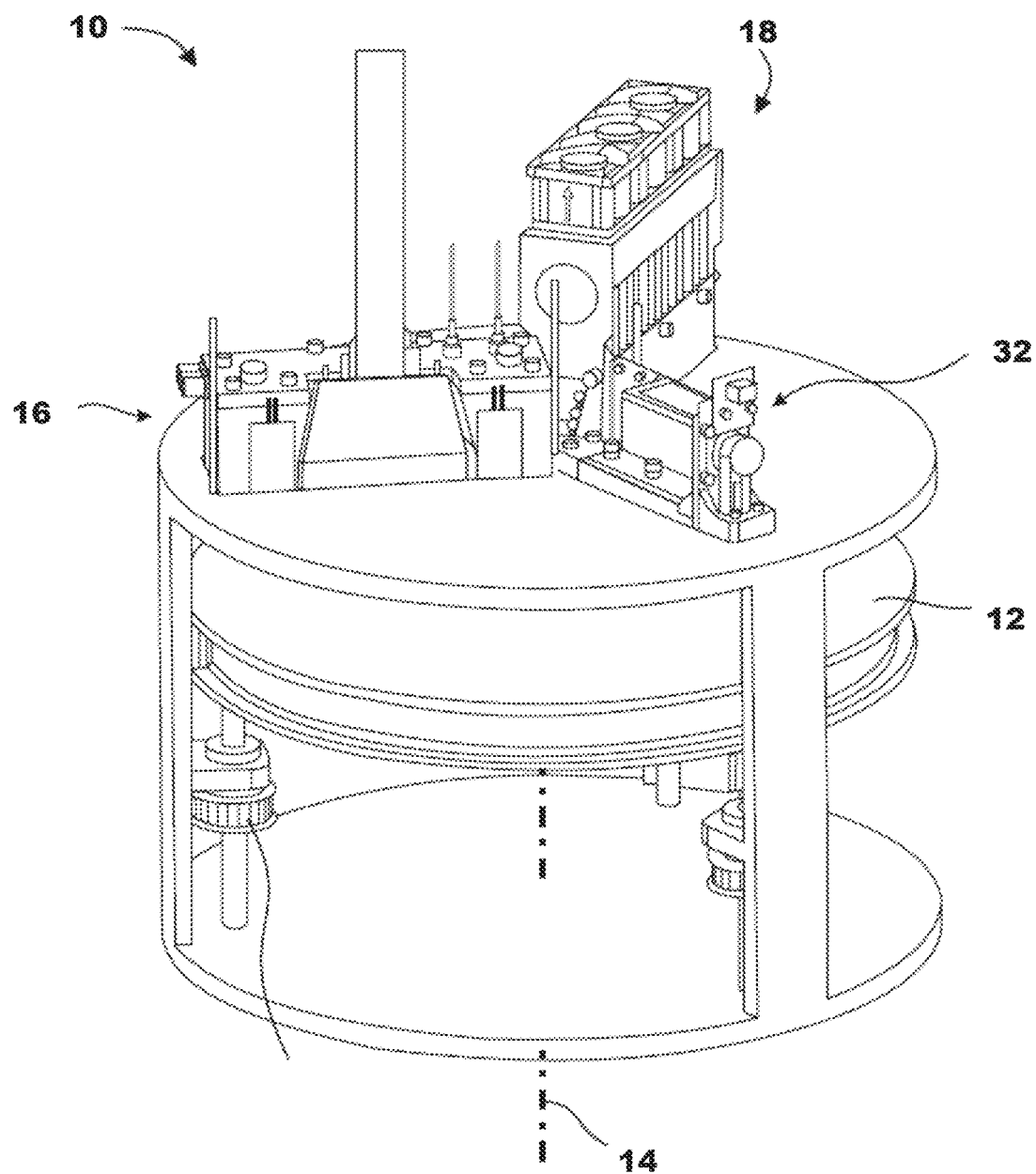

Another representative and non-limiting example of a system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10.

In the present embodiments, system 10 comprises a tray 12 and a plurality of dispensing heads 16, optionally and preferably inkjet printing heads, each having a plurality of separated nozzles. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While the embodiments below are described with a particular emphasis to configuration (i) wherein the tray is a rotary tray that is configured to rotate about vertical axis 14 relative to heads 16, it is to be understood that the present application contemplates also configurations (ii) and (iii). Any one of the embodiments described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction φ, and a direction perpendicular to tray 12 is referred to herein is the vertical direction z.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a supporting structure for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably parallel to each other.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $φ_1$, and another head can be oriented radially and positioned at azimuthal position $φ_2$. In this example, the azimuthal offset between the two heads is $φ_1-φ_2$, and the angle between the linear nozzle arrays of the two heads is also $φ_1-φ_2$.

In some embodiments, two or more printing heads can be assembled to a block of printing heads, in which case the printing heads of the block are typically parallel to each other. A block including several heads 16a, 16b, 16c is illustrated in FIG. 2C.

In some embodiments, system 10 comprises a tray support member 30 positioned below heads 16 such that tray 12 is between tray support member 30 and heads 16. Tray support member 30 may serve for preventing or reducing vibrations of tray 12 that may occur while heads 16 operate. In configurations in which printing heads 16 rotate about axis 14, tray support member 30 preferably also rotates such that tray support member 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, tray support member 30 preferably also moves vertically together with tray 12. In configurations in which the vertical distance is varied by heads 16 along the vertical direction, while maintaining the vertical position of tray 12 fixed, tray support member 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of heads 16 and optionally and preferably also of one or more other components of system 10, e.g., the motion of tray 12, are controlled by a controller 20. The controller can has an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data in any of the aforementioned formats. The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 3A:
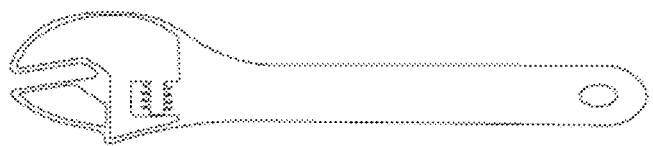
FIGS. 3A and 3B are schematic illustrations demonstrating coordinate transformations according to some embodiments of the present invention.
Figure 3B:
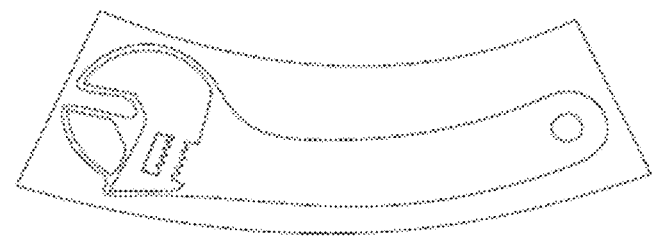

The transformation of coordinates allows three-dimensional printing over a rotating tray. In conventional three-dimensional printing, the printing heads reciprocally move above a stationary tray along straight lines. In such conventional systems, the printing resolution is the same at any point over the tray, provided the dispensing rates of the heads are uniform. Unlike conventional three-dimensional printing, not all the nozzles of the head points cover the same distance over tray 12 during at the same time. The transformation of coordinates is optionally and preferably executed so as to ensure equal amounts of excess material at different radial positions. Representative examples of coordinate transformations according to some embodiments of the present invention are provided in FIGS. 3A-B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material in layers, such as to print a three-dimensional object on tray 12.

System 10 optionally and preferably comprises a solidification system 18, which may optionally and preferably comprise one or more radiation sources, which can be, for example, an ultraviolet or visible or infrared lamp, or other sources of electromagnetic radiation, or electron beam source, depending on the modeling material being used. Radiation source can include any type of radiation emitting device, including, without limitation, light emitting diode (LED), digital light processing (DLP) system, resistive lamp and the like. Solidification system 18 serve for solidifying (e.g., curing) the modeling material. In various exemplary embodiments of the invention the operation of solidification system 18 is controlled by controller 20 which may activate and deactivate solidification system 18 and may optionally also control the amount of radiation generated by solidification system 18.

In some embodiments of the invention, system 10 further comprises one or more leveling devices 32 which can be manufactured as a roller or a blade. Leveling device 32 serves to straighten the newly formed layer prior to the formation of the successive layer thereon. In some optional embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some optional embodiments contemplate the fabrication of an object by dispensing different materials from different dispensing heads. These embodiments provide, inter alia, the ability to select materials from a given number of materials and define desired combinations of the selected materials and their properties. According to the present embodiments, the spatial locations of the deposition of each material with the layer is defined, either to effect occupation of different three-dimensional spatial locations by different materials, or to effect occupation of substantially the same three-dimensional location or adjacent three-dimensional locations by two or more different materials so as to allow post deposition spatial combination of the materials within the layer, thereby to form a composite material at the respective location or locations.

Any post deposition combination or mix of modeling materials is contemplated. For example, once a certain material is dispensed it may preserve its original properties. However, when it is dispensed simultaneously with another modeling material or other dispensed materials which are dispensed at the same or nearby locations, a composite material having a different property or properties to the dispensed materials is formed.

The present embodiments thus enable the deposition of a broad range of material combinations, and the fabrication of an object which may consist of multiple different combinations of materials, in different parts of the object, according to the properties desired to characterize each part of the object.

Further details on the principles and operations of an AM system suitable for the present embodiments are found in U.S. Published Application No. 20100191360, the contents of which are hereby incorporated by reference.

Figure 4:
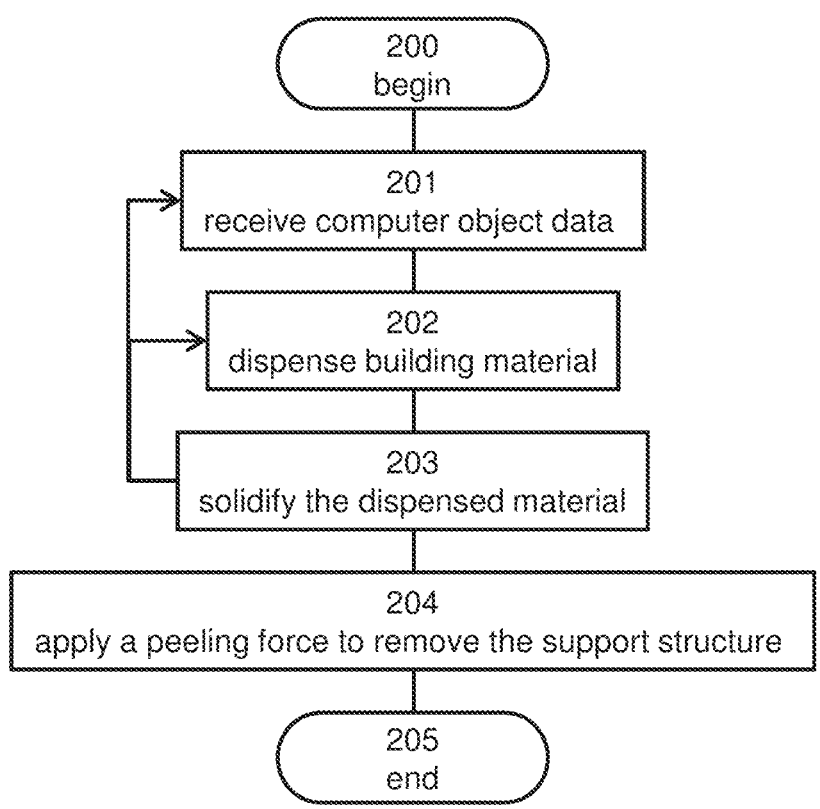
FIG. 4 is a flowchart diagram of the method according to various exemplary embodiments of the present invention.

FIG. 4 is a flowchart diagram of the method according to various exemplary embodiments of the present invention. The method can be used for fabricating any object, including, without limitation, an artificial medical structure (e.g. a dental structure), a mold, and a housing for an electronic device.

The method begins at 200 and optionally and preferably proceeds to 201 at which computer object data in any of the aforementioned formats are received. The method can proceed to 202 at which a layer of building material is dispensed. The building material can be a modeling material or a support material. In some embodiments of the present invention the method selectively dispenses for a particular layer, one or more regions of modeling materials and one or more regions of support material. The modeling material is preferably dispensed in a configured pattern corresponding to the shape of the object and in accordance with the computer object data.

Figure 5A:
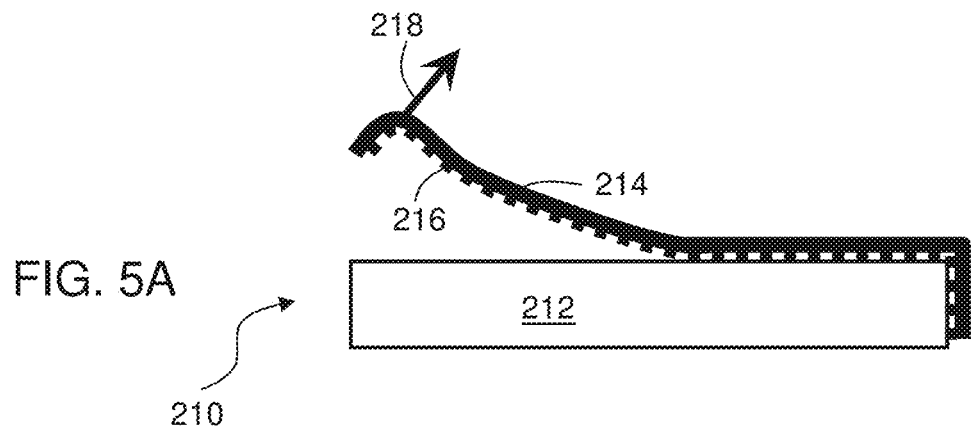
FIGS. 5A-5C are schematic illustrations of an object formed with a peelable sacrificial structure, according to some embodiments of the present invention.
Figure 13:
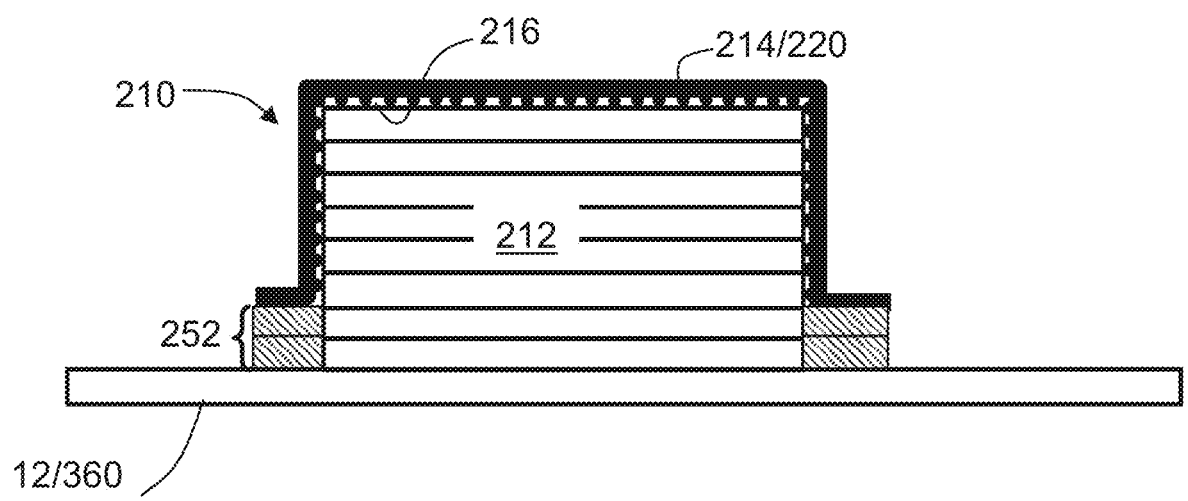
FIG. 13 is a schematic illustration of an object formed on a tray, with a sacrificial structure formed partially over a pedestal on the tray, according to some embodiments of the present invention.

In some embodiments of the present invention the dispensing of modeling material in the configured pattern corresponding to the shape of the object is preceded by a dispensing procedure in which a structure, referred to herein as "a pedestal" is dispensed directly on the tray. In these embodiments, at least a portion of the layers that make up the sacrificial structure and/or optionally, the object, are thereafter dispensed on the pedestal. This embodiment is illustrated in FIG. 13, which shows a side view of a pedestal 252 on tray 12/360 wherein sacrificial structure 214/220 is dispensed partially on pedestal 252 and partially on the stack of layers 212 forming object 210. The present embodiments contemplate also at least one intermediate layer 216 of support material between sacrificial structure 214/220 and object 210, that optionally and preferably surrounds at least a portion of the object (e.g., as illustrated in FIG. 5A). Optionally, one or more intermediate layers of support material are dispensed between sacrificial structure 214/220 and pedestal 252.

Pedestal 252 optionally and preferably serves to ease the removal of the sacrificial structure and/or the object from the tray and thus may aid in separation of the sacrificial structure from the tray and/or object, and/or prevent deformation of the object by manual or mechanical damage. Pedestal 252 can also improve the object's accuracy in the Z direction (height), and/or may improve an object's accuracy in the X-Y directions.

Pedestal 252 preferably comprises a support formulation that includes a support material. Preferably the support formulation is soluble in liquid, e.g., in water. In various exemplary embodiments of the invention pedestal 252 comprises a combination of support formulation and modeling formulation (e.g., any of the first and second modeling formulations described herein). Preferably, the modeling formulation within pedestal 252 is of low Izod impact resistance, for example, less than 40 J/m. The advantage of this embodiment is that it reduces the tendency of the pedestal to lift from the tray, and/or maintains its structural integrity.

Inaccuracies in Z may occur at the lowest layers of the printed object. This may be because the top surface of the tray at Z start level (the Z level of the tray when printing starts) may not be exactly at a height which enables the leveling device to reach and thus level the first layers deposited in the printing process, when the leveling device may be at its lowest point (e.g., because of inaccuracy in adjustments and/or incomplete flatness and horizon of the tray). As a result, the lower layers of the object may not be leveled by the leveling device and therefore their thickness may be greater than the desired layer thickness, therefore increasing the height of the object as printed and/or reducing the quality of the final object in contrast to the object as designed. The use of pedestal 252 under the lowest point of the object solves this problem by specifying that the height at which the printing of the actual object starts may be the height at which the pedestal itself may be significantly leveled by the leveling device.

In some embodiments of the invention pedestal 252 has a core-shell structure, in which the shell comprises spaced pillars of modeling formulation with support formulation in-between, and the core comprises only soluble (e.g., water soluble) support formulation, and is devoid of any non-soluble modeling material. The advantage of forming a pedestal with such a core-shell structure is that it solves the problems of Z inaccuracies and curling while minimizing the use of modeling material, which is typically more expensive, and tends to leave visible remnants at the bottom of the object.

In the schematic illustration shown in FIG. 13, the stack 212 of the layers of object 210 is dispensed directly on the tray 12/360. However, this need not necessarily be the case, since, in some embodiments the stack 212 is dispensed on the pedestal 252.

Referring again to FIG. 4, the method optionally and preferably proceeds to 203 at which the dispensed building material is solidified. The type of solidification process depends on the type of dispensed materials. For example, when the building material is UV curable, the solidification comprises applying UV radiation, when the building material is curable by other radiation (e.g., infrared or visible light), the solidification comprises applying radiation at a wavelength that cures the building material.

Operations 202 and 203, and in some embodiments also 201, are preferably executed sequentially a plurality of times so that a plurality of layers are sequentially dispensed and solidified. This is illustrated in FIG. 4 as loop back arrows pointing from operation 203 to operations 201 and 202. The layers are dispensed to form a stack of model layers made of a modeling material, and a sacrificial structure, wherein the stack of model layers and the sacrificial structure are separable from each other in a manner that maintains the shape and size of the stack of model layers without deformation.

In some embodiments of the present invention the method dispenses digital material for at least one of the layers.

The phrase "digital materials", as used herein and in the art, describes a combination of two or more materials on a microscopic scale or voxel level such that the printed zones of a specific material are at the level of few voxels, or at a level of a voxel block. Such digital materials may exhibit new properties that are affected by the selection of types of materials and/or the ratio and relative spatial distribution of two or more materials.

In exemplary digital materials, the modeling or support material of each voxel or voxel block, obtained upon curing, is independent of the modeling or support material of a neighboring voxel or voxel block, obtained upon curing, such that each voxel or voxel block may result in a different modeling or support material and the new properties of the whole object are a result of a spatial combination, on the voxel level, of several different model materials.

Herein throughout, whenever the expression "at the voxel level" is used in the context of a different material and/or properties, it is meant to include differences between voxel blocks, as well as differences between voxels or groups of few voxels. In preferred embodiments, the properties of the whole object are a result of a spatial combination, on the voxel block level, of several different model materials.

Once all the layers are formed, the method preferably proceeds to 204 at which a peeling force is applied to the sacrificial structure to remove the sacrificial structure, preferably in its entirety. Preferably, the peeling is executed in a dry environment. According to some of any of the embodiments of the invention described herein, the magnitude of the peeling force is from about 1 N to about 20 N, e.g., about 5N or about 10 N or about 15 N.

When the stack 212 of the layers of object 210 is dispensed on the tray 12/360, and the sacrificial structure is dispensed partially on the pedestal (as illustrated in FIG. 13), operation 204 is optionally and preferably executed while the object is still on the tray. This is because the adhesive forces between the sacrificial structure and the tray are less than the adhesive forces between the stack 212 and the tray, so that the magnitude of the peeling force can be selected to remove the sacrificial structure from the object without lifting the object from the tray. In experiments performed by the inventor, it was found that a portion of the pedestal is removed during peeling together with the sacrificial structure, but the stack successfully remains on the tray. When both the stack 212 and the sacrificial structure 214/220 are dispensed on the tray 12/360 or on the pedestal 252, operation 204 is optionally and preferably executed after the object is removed from the tray, as shown in the images shown in FIGS. 8A-C and 11.

The method ends at 205.

The method can be executed for fabricating a single object or a plurality of objects as desired. When a plurality of objects are fabricated, operations 201, 202 and 203 can be executed collectively (e.g., simultaneously) for all the objects. For example, the computer object data can include data describing an arrangement of all the objects including their individual shapes on the working tray 12/360, the dispensing can be in a manner that each dispensed layer includes a plurality of separate regions each forming a layer of one of the objects to be formed, and the solidifying can be executed to collectively solidify all the regions of the newly formed layer. The peeling operation can be executed individually for each dispensed object or collectively for more than one object, e.g., all the objects that are formed collectively by operations 201 to 203.

In embodiments in which the peeling operation is executed collectively for more than one object, the fabrication process and materials are optionally and preferably selected such that the adhesion forces between the fabricated objects and the peelable sacrificial structure are less than the adhesion forces between the objects and the surface on which they are dispensed (namely the adhesion forces between the bottom-most layers of the objects and the surface on which these layers are dispensed, e.g. the tray). This can be ensured for example, by executing operation 202 without forming the pedestal beneath the stack 212. Preferably, but not necessarily, a pedestal is formed beneath the sacrificial structure at regions that do not cover the layers of stack 212. The object thus adheres to the receiving surface underneath it more strongly than to the sacrificial layers above it or at its sides, so that when the sacrificial structure is peeled off, the sacrificial structure is removed from the object without lifting the object from the receiving surface. Preferably, but not necessarily, a disposable medium is placed on the working tray of the additive manufacturing apparatus (e.g., tray 12 or tray 360) so as to protect the tray from remnants of building material that may adhere strongly thereto.

Figure 14A:
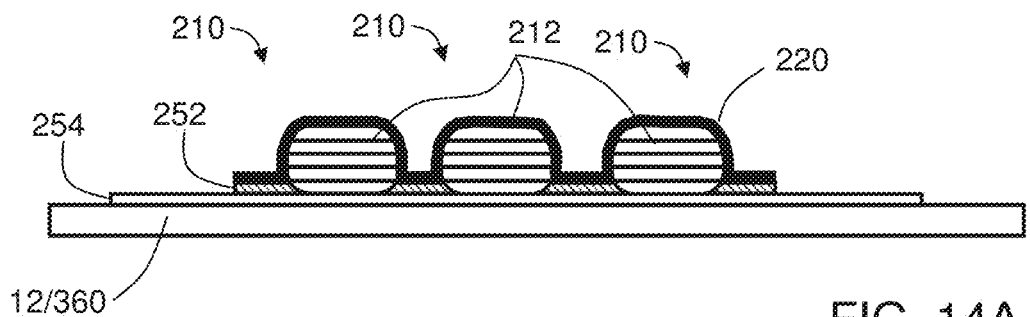
FIGS. 14A-14D are schematic illustrations of a process suitable for peeling a sacrificial structure collectively from a plurality of objects, according to some embodiments of the present invention.

The process of peeling the sacrificial structure collectively from a plurality of objects is illustrated schematically in FIGS. 14A-D. FIG. 14A illustrates several objects 210, each made of at least a stack 212 of layers as further detailed above, and pedestal 252, once dispensed and solidified. Pedestal 252 is illustrated as a single layer, but in some embodiments pedestal 252 comprises several layers. In this schematic illustration, the pedestal 252 and the stacks 212 that form the objects 210 are formed on a disposable medium 254 (e.g., a planar substrate such as but not limited to a plastic slide, glass plate, a sheet of paper and the like). However, this need not necessarily be the case, since, in some embodiments the stacks and the pedestal are dispensed directly on the tray 12/360. Preferably, none of the layers of the stack of the object is dispensed on the pedestal so as to maintain sufficiently high adhesive forces between stack 212 and the tray (or the disposable medium, if used). Unlike stack 212, sacrificial structure 214/220 is dispensed partially on the pedestal 252 and partially on (see FIG. 14A) or around (not shown, see FIG. 5A) stack 212. This ensures that the adhesive forces between the sacrificial structure and the stack is less than the adhesive forces between the stack and the tray or disposable medium. One or more intermediate layers of support material (not shown) are optionally and preferably formed between the sacrificial structure 214/220 and the stack 212 and/or the pedestal, as shown in FIG. 13 as intermediate layer 216. Optionally, intermediate layer(s) of support material are also formed between sacrificial structure 214/220 and pedestal 252.

Figure 14B:
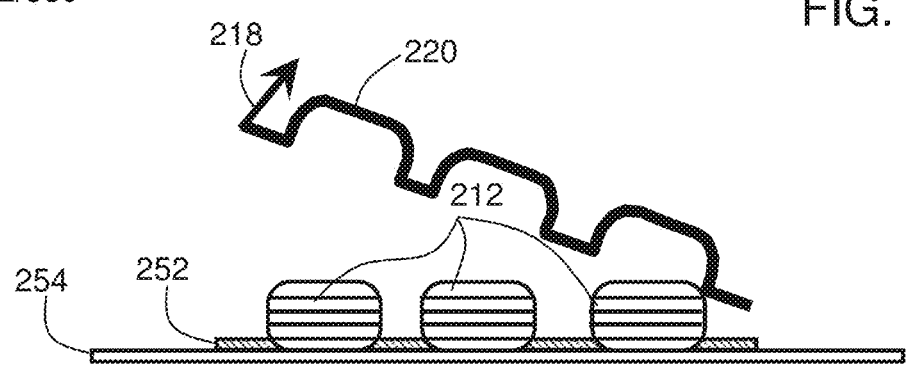
Figure 14C:
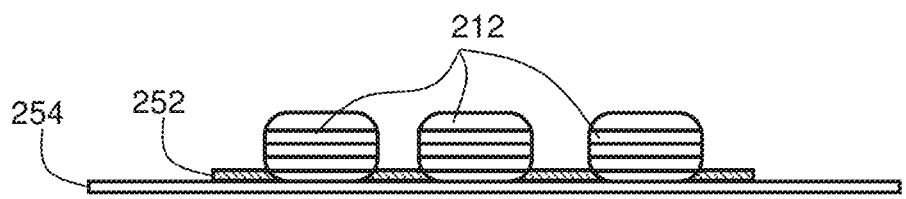
Figure 14D:
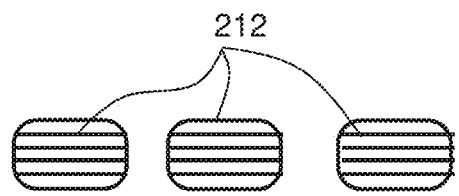

FIG. 14B illustrates the peeling force 218 that is applied to the sacrificial structure to remove the sacrificial structure, preferably in its entirety. In some embodiments (not illustrated in FIGS. 14A-D), the sacrificial structure is divided into two or more separate or separable sections, each covering at least two spaced apart objects. In these embodiments, each of the sections can be peeled separately from the pedestal and objects to which it adheres. These embodiments are particularly useful when the tray or disposable medium is large in its lateral dimensions (e.g., at least 1200 cm$^2$). When the disposable medium is used, it is optionally and preferably removed from the tray before applying the peeling force. FIG. 14C illustrates the stacks 212 and pedestal 252 after the removal of the sacrificial layer. Once the sacrificial layer is removed (either in one piece or section by section), the stack 212 is lifted from the tray or disposable medium, and the remnants of the pedestal are cleaned, as illustrated in FIG. 14D.

Figure 15A:
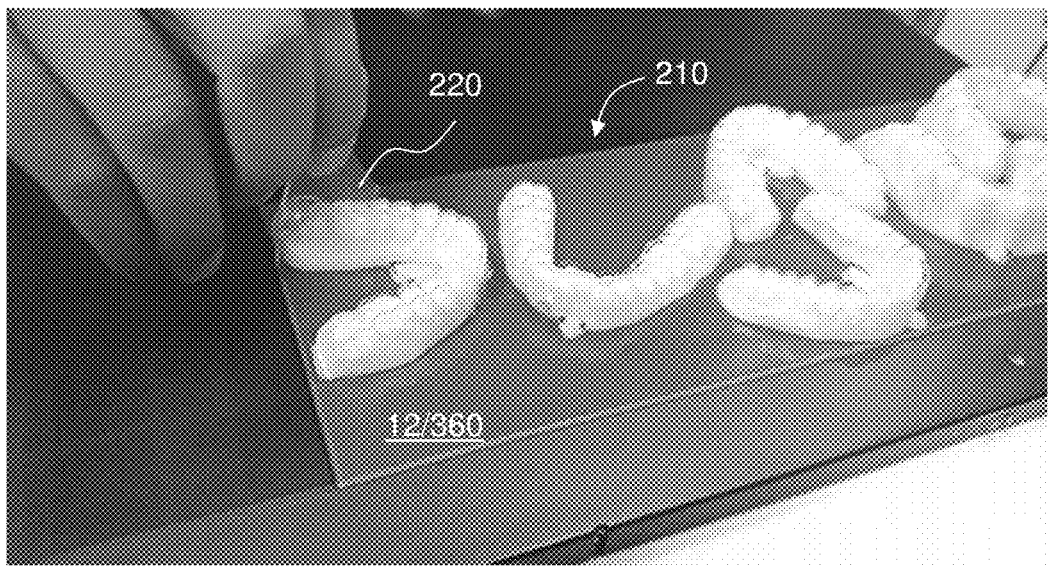
FIGS. 15A and 15B are images taken during experiment performed according to the embodiment illustrated in FIGS. 14A-14D.
Figure 15B:
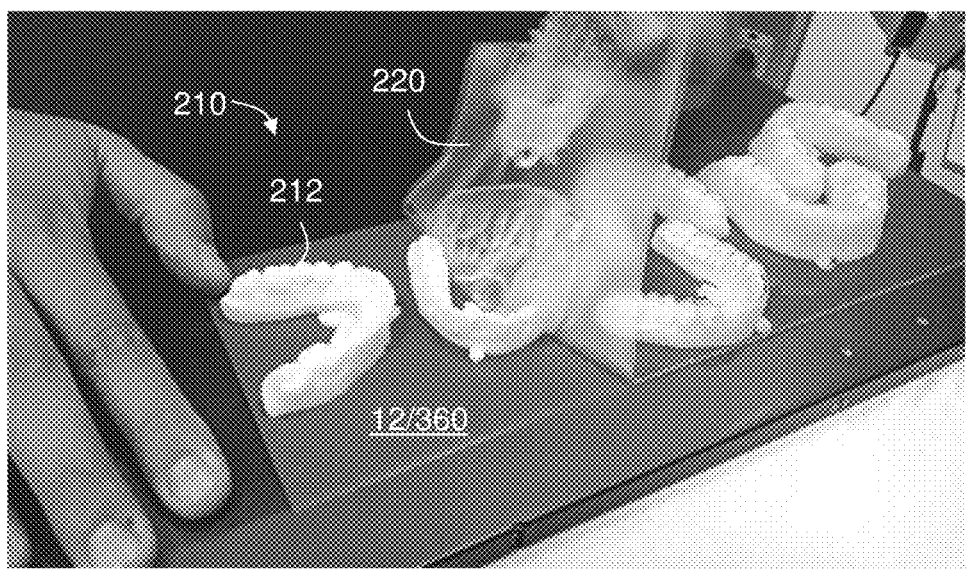

FIGS. 15A and 15B are images taken during experiment performed according to the embodiment illustrated in FIGS. 14A-D.

The removal of the sacrificial structure by peeling according to some embodiments of the present invention is unlike conventional techniques in which water-jet or other chemical methods, such as dissolution in a solvent, with or without heating are employed.

The present inventors found that in many cases conventional removal of support may involve hazardous materials, manual labor and/or special equipment requiring trained personnel, protective clothing and expensive waste disposal. The present inventors realized that the dissolution process can be limited by diffusion kinetics and may require very long periods of time. The present inventors also realized that in some cases post-processing is be necessary to remove traces of residual substances, such as mixtures of hardened modelling and support materials, formed on the surfaces of the object. The present inventors further realized that removal that requires elevated temperatures can also be problematic since it may be inconvenient and requires special equipment.

In a search for a solution to these problems, the present inventors devised a fabrication technique that facilitates removal of the sacrificial structure by peeling, without the need for water jets, chemical processes and/or elevated temperatures. Effective removal of the sacrificial structure by peeling can be ensured in more than one way.

In some embodiments of the present invention, the sacrificial structure has a stack of sacrificial layers made of an elastomeric material. Any elastomeric material can be employed. A representative example of an elastomeric material suitable for use as an elastomeric material according to some embodiments of the present invention is provided hereinbelow and is further detailed in International Patent Application entitled "ADDITIVE MANUFACTURING OF RUBBER-LIKE MATERIALS" claiming priority to U.S. Provisional Patent Application No. 62/342,970 filed May 29, 2016, the contents of which are incorporated herein by reference in their entirety.

A representative example of object formed with an elastomeric material is illustrated in FIG. 5A. Shown is an object 210 having a stack 212 of model layers, and a sacrificial structure 214 having a stack of sacrificial layers made of an elastomeric material. For clarity of presentation the individual layers forming stack 212 and structure 214 are not illustrated, but each of these stacks is optionally and preferably formed of two or more layers made of the respective material. In some embodiments of the present invention, a stack 216 of intermediate layers is also formed between stack 212 and structure 214. Stack 216 is optionally and preferably made of a support material having an elastic modulus less than the elastic modulus of the elastomeric material. The advantage of stack 216 is that it prevents the modelling material of stack 212 from sticking to the elastomeric material of stack 214 and therefore facilitates the separation of structure 214 from stack 212 upon application of a peeling force 218. The removal of structure 214 by peeling force 218 exposes stack 212 (as illustrated in FIG. 5A) or, when a residue of the intermediate layers remains on the surface of stack 212, it may also expose such a residue.

According to some of any of the embodiments of the invention a thickness of stack 216 of intermediate layers along a direction perpendicular to the surface of object 210 is from about 100 microns to about 300 microns, more preferably from about 210 microns to about 290 microns, more preferably from about 220 microns to about 280 microns, e.g., about 250 microns. In experiments performed by the Inventors it was found that a thickness of about 250 microns is adequate for preventing sticking, and at the same time allows the use of sacrificial structure which is relatively thin and which is characterized by a relatively low tear resistance. For example, in some embodiments of the present invention the sacrificial structure 214 is characterized, once solidified, by a tear resistance of from about 4 kN per meter to about 8 kN per meter, more preferably from about 5 kN per meter to about 7 kN per meter, when measured according to international standard ASTM D-624. Higher tear resistances are also contemplated. Preferably, the tear resistance of sacrificial structure 214 is at least 4 kN per meter, when measured according to international standard ASTM D-624, once solidified.

The minimal thickness of sacrificial structure 214 along a direction perpendicular to the surface of object 210 is optionally and preferably from about 500 microns to about 3 mm, more preferably from about 500 microns to about 2.5 mm, more preferably from about 500 microns to about 2 mm.

In embodiments in which an elastomeric material is used for forming sacrificial structure 214, the magnitude of peeling force 218 can be about ION, but other values are also contemplated.

Figure 5B:
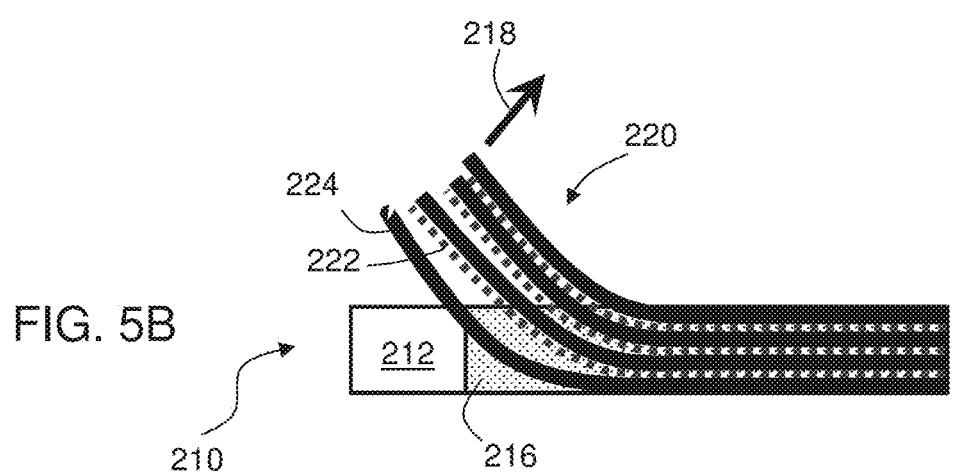
Figure 5C:
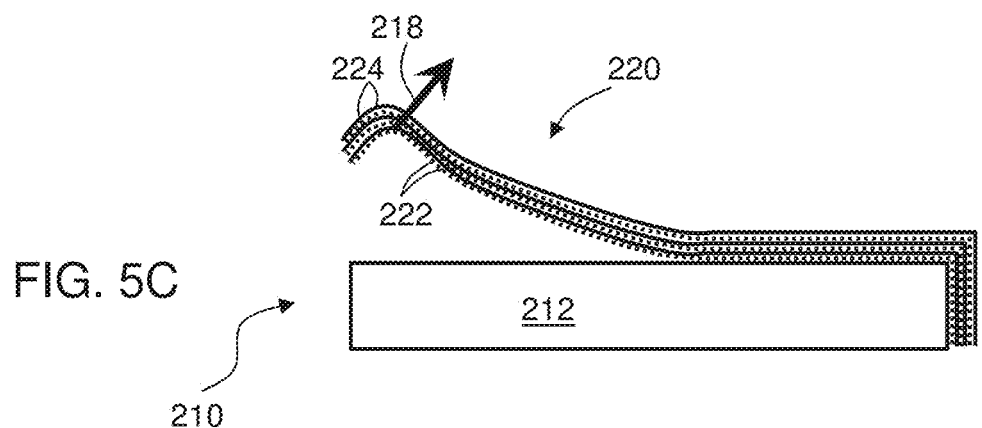

In some embodiments of the present invention, the sacrificial structure is a layered sacrificial structure formed of interlaced slices of support material and modeling material. These embodiments are illustrated in FIGS. 5B and 5C. Shown is an object 210 having a stack 212 of model layers, and a layered sacrificial structure 220 which comprises slices 222 of support material (dotted line) and slices 224 of modeling material (solid line). Slices 222 and 224 are interlaced with each other. In the illustration of FIG. 5B, the interlacing is along the built direction of object 210 (the Z direction, see FIGS. 1A and 1C). In the illustration of FIG. 5B, the interlacing is along a direction is perpendicular to the built direction of object 210.

Figure 11:
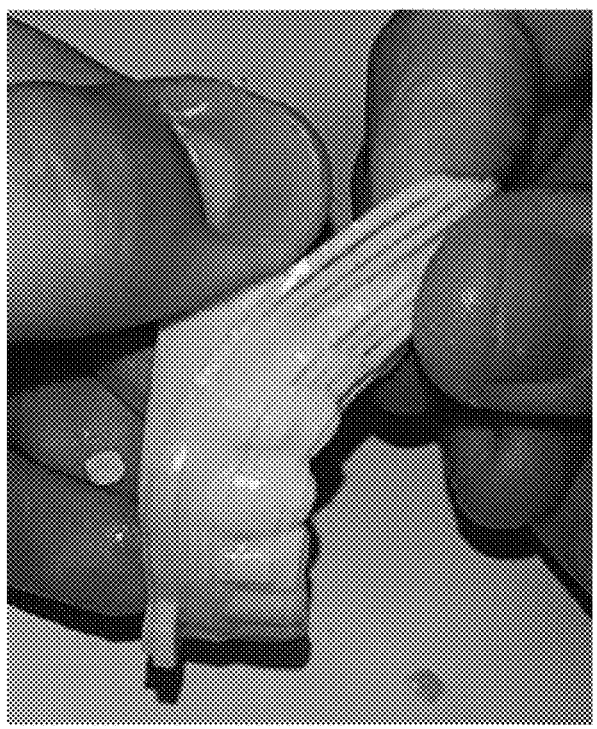
FIG. 11 is an image showing the peeling process of an interlaced sacrificial structure off the dental structure, according to some embodiments of the present invention.

The interlacing provides sacrificial structure 220 with a flexibility that allows the removal of structure 220 from stack 212 by application of peeling force 218, as may be seen for example in FIG. 11, showing the peeling process of an interlaced sacrificial structure off a dental structure.

Such a sacrificial structure allows the use of a relatively rigid modeling material in slices 224. For example, the modeling material in slices 224 can have a flexural modulus from about 2000 MPa to about 4000 MPa, more preferably from about 2000 MPa to about 3500 MPa, from about 2200 MPa to about 3200 MPa, when measured according to international standard ASTM D-790-04.

The advantage of using interlacing between modeling and support slices is that it allows making object 210 from one modeling material, which is particularly useful when the system used for fabricating the object includes a single model head or a plurality of model heads all dispensing the same modelling material. Thus, in some embodiments of the present invention the modeling material of the stack 212 of model layers and the modeling material in slices 224 of the sacrificial structure 220 are the same modeling material. A representative example of a modeling material suitable for the present embodiments is VeroWhitePlus™, marketed by Stratasys, Israel. A representative example of a support material suitable for the present embodiment is SUP706™ marketed by Stratasys, Israel.

In embodiments in which the interlacing is along the built direction (FIG. 5B), stack 216 of intermediate layers is optionally and preferably formed between stack 212 and structure 220. The thickness of stack 216 along a direction perpendicular to the surface of object 210 can be as further detailed hereinabove. In experiments performed by the Inventors it was found that a thickness of about 250 microns is adequate for preventing sticking between stack 212 and the other slices of structure 220, while using a support material having sufficient rigidity.

The height of each slice 224 of modeling material along the built direction (the Z direction) is typically from about 250 microns to about 4 mm, or from about 1 mm to about 2 mm. The height of each slice 224 of modeling material along the built direction (the Z direction) is typically from about 100 microns to about 300 microns, or from about 150 microns to about 250 microns, e.g., about 200 microns.

In embodiments in which the interlacing is perpendicular to the built direction (FIG. 5C), structure 220 is preferably fabricated in a manner that the slice that is adjacent to stack 212 is made of a support material. Such a slice may serve as a release stack as further detailed hereinabove with respect to the embodiment shown in FIG. 5A. Preferably, but not necessarily, the slice of support material that adjacent the stack 212 is thicker (e.g., about 10%-40% thicker) than any other slice of support material of structure 220. For example, when the slice of support material that adjacent the stack 212 is about 250 microns in thickness, the other slices 222 can be about 200 microns in thickness.

The overall thickness of sacrificial structure 220 along a direction perpendicular to the surface of object 210 is optionally and preferably selected such that a peeling force of about 5 N results in a bending strain 8 of sacrificial structure 220 wherein s is at least 0.02, more preferably at least 0.022, more preferably 0.024, more preferably 0.026.

The bending strain s may be defined as the ratio between the change in length of sacrificial structure 220 as a result of the peeling force 218 and the length of sacrificial structure 220 before application of peeling force 218.

For example, the minimal thickness of sacrificial structure 220 along a direction perpendicular to the surface of object 210 can be from about 500 microns to about 3 mm, more preferably from about 500 microns to about 2.5 mm, more preferably from about 500 microns to about 2 mm.

In embodiments in which interlaced slices 222 and 224 are used for forming sacrificial structure 220, the magnitude of peeling force 218 can be about 5N, but other values are also contemplated.

FIGS. 5A-C illustrate embodiments in which the stack 212 of model layers fills a cavity partially enclosed by sacrificial structure 214/220. In these illustrations which are not intended to be limiting, stack 212 is enclosed by the sacrificial structure from all but one facet of stack 212 (the base of stack 212 in the present illustration). The present embodiments also contemplate applications in which stack 212 fills a cavity that is fully enclosed by the sacrificial structure. In these applications, the peeling can be accomplished in more than one stage. For example, firstly the part of the sacrificial structure that covers one side of stack 212 (e.g., the part that covers the base) is peeled off, and then the other parts are peeled off.

Figure 6:
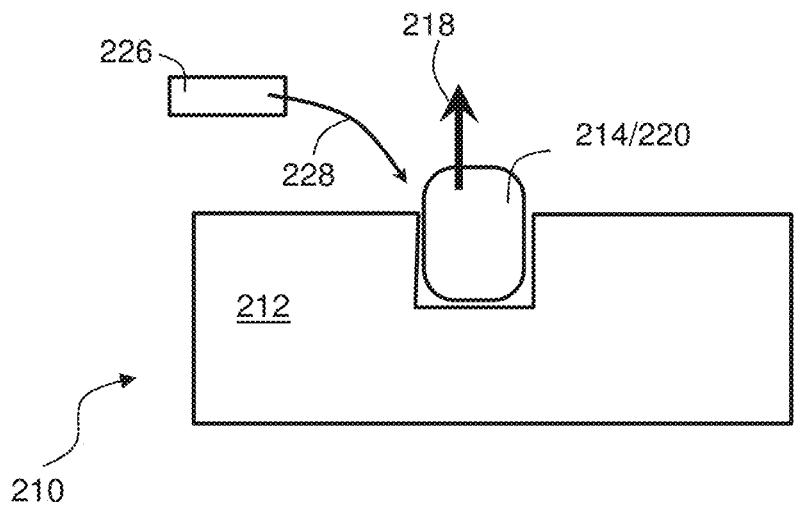
FIG. 6 is a schematic illustration of an object in which the sacrificial structure fills a cavity partially enclosed by a stack of model layers, according to some embodiments of the present invention.

Also contemplated are embodiments in which the sacrificial structure 214/220 fills a cavity partially enclosed by stack 212 of model layers. These embodiments are illustrated in FIG. 6. These embodiments are particular useful for making molds. These embodiments are also useful for making a housing for a foreign element such as, but not limited to, an electronic device. For example, following the removal of the sacrificial structure 214/220, a foreign element 226 can be placed 228 in the cavity. Foreign element 226 can be for example, an electronic device selected from the group consisting of a microchip, a battery, a PCB, a light emitting device (e.g., a light emitting diode or a lamp), a radiofrequency identification (RFID) tag, a transistor, and the like.

Following is a description of an elastomeric material suitable for use as an elastomeric material according to some embodiments of the present invention.

The elastomeric formulation as described herein comprises an elastomeric material. Optionally and preferably the elastomeric formulation also comprises silica particles.

The phrase "elastomeric material" describes a solidifiable (e.g., curable) material, as defined herein, which following a solidification (for example, upon exposure to energy, such as, but not limited to, curing energy) acquires properties of an elastomer (a rubber, or rubber-like material).

Elastomeric materials typically comprise one or more polymerizable (curable) groups, which undergo polymerization upon exposure to a suitable curing energy, linked to a moiety that confers elasticity to the polymerized and/or cross-linked material. Such moieties typically comprise alkyl, alkylene chains, hydrocarbon, alkylene glycol groups or chains (e.g., oligo or poly(alkylene glycol) as defined herein, urethane, oligourethane or polyurethane moieties, as defined herein, and the like, including any combination of the foregoing, and are also referred to herein as "elastomeric moieties".

An elastomeric mono-functional curable material according to some embodiments of the present invention can be a vinyl-containing compound represented by Formula I:

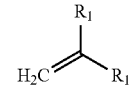

Formula I wherein at least one of $R_1$ and $R_2$ is and/or comprises an elastomeric moiety, as described herein.

The ($=CH_2$) group in Formula I represents a polymerizable group, and is, according to some embodiments, a UV-curable group, such that the elastomeric material is a UV-curable material.

For example, $R_1$ is or comprises an elastomeric moiety as defined herein and $R_2$ is, for example, hydrogen, C(1-4) alkyl, C(1-4) alkoxy, or any other substituent, as long as it does not interfere with the elastomeric properties of the cured material.

In some embodiments, $R_1$ is a carboxylate, and the compound is a mono-functional acrylate monomer. In some of these embodiments, $R_2$ is methyl, and the compound is mono-functional methacrylate monomer. Curable materials in which $R_1$ is carboxylate and $R_2$ is hydrogen or methyl are collectively referred to herein as "(meth)acrylates".

In some of any of these embodiments, the carboxylate group, —C(=O)—ORa, comprises Ra which is an elastomeric moiety as described herein.

In some embodiments, $R_1$ is amide, and the compound is a mono-functional acrylamide monomer. In some of these embodiments, $R_2$ is methyl, and the compound is mono-functional methacrylamide monomer. Curable materials in which $R_1$ is amide and $R_2$ is hydrogen or methyl are collectively referred to herein as "(meth)acrylamide".

(Meth)acrylates and (meth)acrylamides are collectively referred to herein as (meth)acrylic materials.

In some embodiments, $R_1$ is a cyclic amide, and in some embodiments, it is a cyclic amide such as lactam, and the compound is a vinyl lactam. In some embodiments, $R_1$ is a cyclic carboxylate such as lactone, and the compound is a vinyl lactone.

When one or both of $R_1$ and $R_2$ comprise a polymeric or oligomeric moiety, the mono-functional curable compound of Formula I is an exemplary polymeric or oligomeric mono-functional curable material. Otherwise, it is an exemplary monomeric mono-functional curable material.

In multi-functional elastomeric materials, the two or more polymerizable groups are linked to one another via an elastomeric moiety, as described herein.

In some embodiments, a multifunctional elastomeric material can be represented by Formula I as described herein, in which $R_1$ comprises an elastomeric material that terminates by a polymerizable group, as described herein.

For example, a di-functional elastomeric material can be represented by Formula I*:

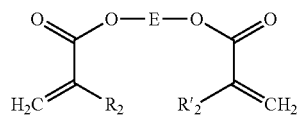

Formula I* wherein E is an elastomeric linking moiety as described herein, and $R'_2$ is as defined herein for $R_2$.

In another example, a tri-functional elastomeric material can be represented by Formula II:

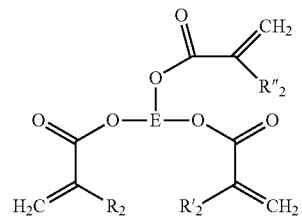

Formula II wherein E is an elastomeric linking moiety as described herein, and $R'_2$ and $R''_2$ are each independently as defined herein for $R_2$.

In some embodiments, a multi-functional (e.g., di-functional, tri-functional or higher) elastomeric material can be collectively represented by Formula III:

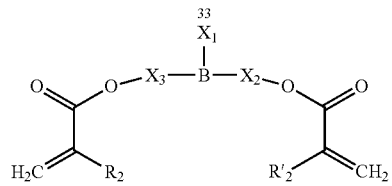

Formula III

Wherein:
$R_2$ and $R'_2$ are as defined herein;
B is a di-functional or tri-functional branching unit as defined herein (depending on the nature of $X_1$);
$X_2$ and $X_3$ are each independently absent, an elastomeric moiety as described herein, or is selected from an alkyl, a hydrocarbon, an alkylene chain, a cycloalkyl, an aryl, an alkylene glycol, a urethane moiety, and any combination thereof; and $X_1$ is absent or is selected from an alkyl, a hydrocarbon, an alkylene chain, a cycloalkyl, an aryl, an alkylene glycol, a urethane moiety, and an elastomeric moiety, each being optionally being substituted (e.g., terminated) by a meth(acrylate) moiety (O—C(=O)CR''$_2$=CH$_2$), and any combination thereof, or, alternatively, $X_1$ is:

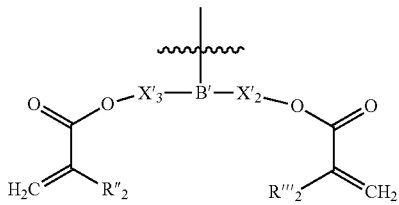

wherein: B' is a branching unit, being the same as, or different from, B;
$X'_2$ and $X'_3$ are each independently as defined herein for $X_2$ and $X_3$; and
$R''_2$ and $R'''_2$ are as defined herein for $R_2$ and $R'_2$.
Provided that at least one of $X_1$, $X_2$ and $X_3$ is or comprises an elastomeric moiety as described herein.

The term "branching unit" as used herein describes a multi-radical, preferably aliphatic or alicyclic group. By "multi-radical" it is meant that the linking moiety has two or more attachment points such that it links between two or more atoms and/or groups or moieties.

That is, the branching unit is a chemical moiety that, when attached to a single position, group or atom of a substance, creates two or more functional groups that are linked to this single position, group or atom, and thus "branches" a single functionality into two or more functionalities.

In some embodiments, the branching unit is derived from a chemical moiety that has two, three or more functional groups. In some embodiments, the branching unit is a branched alkyl or a branched linking moiety as described herein.

Multi-functional elastomeric materials featuring 4 or more polymerizable groups are also contemplated, and can feature structures similar to those presented in Formula III, while including, for example, a branching unit B with higher branching, or including an $X_1$ moiety featuring two (meth)acrylate moieties as defined herein, or similar to those presented in Formula II, while including, for example, another (meth)acrylate moiety that is attached to the elastomeric moiety.

In some embodiments, the elastomeric moiety, e.g., Ra in Formula I or the moiety denoted as E in Formulae I*, II and III, is or comprises an alkyl, which can be linear or branched, and which is preferably of 3 or more or of 4 or more carbon atoms; an alkylene chain, preferably of 3 or more or of 4 or more carbon atoms in length; an alkylene glycol as defined herein, an oligo(alkylene glycol), or a poly(alkylene glycol), as defined herein, preferably of 4 or more atoms in length, a urethane, an oligourethane, or a polyurethane, as defined herein, preferably of 4 or more carbon atoms in length, and any combination of the foregoing.

In some of any of the embodiments described herein, the elastomeric material is a (meth)acrylic curable material, as described herein, and in some embodiments, it is an acrylate.

In some of any of the embodiments described herein, the elastomeric material is or comprises a mono-functional elastomeric material, and is some embodiments, the mono-functional elastomeric material is represented by Formula I, wherein $R_1$ is —C(=O)—ORa and Ra is an alkylene chain (e.g., of 4 or more, preferably 6 or more, preferably 8 or more, carbon atoms in length), or a poly(alkylene glycol) chain, as defined herein.

In some embodiments, the elastomeric material is or comprises a multi-functional elastomeric material, and is some embodiments, the multi-functional elastomeric material is represented by Formula I*, wherein E is an alkylene chain (e.g., of 4 or more, or 6 or more, carbon atoms in length), and/or a poly(alkylene glycol) chain, as defined herein.

In some embodiments, the elastomeric material is or comprises a multi-functional elastomeric material, and is some embodiments, the multi-functional elastomeric material is represented by Formula II, wherein E is a branched alkyl (e.g., of 3 or more, or of 4 or more, or of 5 or more, carbon atoms in length).

In some of any of the embodiments described herein, the elastomeric material is an elastomeric acrylate or methacrylate (also referred to as acrylic or methacrylic elastomer), for example, of Formula I, I*, II or III, and in some embodiments, the acrylate or methacrylate is selected such that when hardened, the polymeric material features a Tg lower than 0° C. or lower than −10° C.

Exemplary elastomeric acrylate and methacrylate curable materials include, but are not limited to, 2-propenoic acid, 2-[[(butylamino)carbonyl]oxy]ethyl ester (an exemplary uretheane acrylate), and compounds marketed under the tradenames SR335 (Lauryl acrylate) and SR395 (isodecyl acrylate) (by Sartomer). Other examples include compounds marketed under the tradenames SR350D (a trifunctional trimethylolpropane trimethacrylate (TMPTMA), SR256 (2-(2-ethoxyethoxy)ethyl acrylate, SR252 (polyethylene glycol (600) dimethacrylate), SR561 (an alkoxylated hexane diol diacrylate) (by Sartomer).

In some of any of the embodiment described herein, the elastomeric material comprises one or more mono-functional elastomeric material(s) (e.g., a mono-functional elastomeric acrylate, as represented, for example, in Formula I) and one or more multi-functional (e.g., di-functional) elastomeric materials(s) (e.g., a di-functional elastomeric acrylate, as represented, for example, in Formula I*, II or III) and in any of the respective embodiments as described herein.

In some of any of the embodiments described herein, a total amount of the elastomeric material(s) is at least 40%, or at last 50%, or at least 60%, and can be up to 70% or even 80%, of the total weight of the elastomeric formulation comprising same.

In some of any of the embodiments described herein, the elastomeric formulation further comprises silica particles.

In some of any of the embodiments described herein, the silica particles have an average particle size lower than 1 micron, namely, the silica particles are sub-micron particles. In some embodiments, the silica particles are nanoparticles, having an average particle size in the range of from 0.1 nm to 900 nm, or from 0.1 nm to 700 nm, or from 1 nm to 700 nm, or from 1 nm to 500 nm or from 1 nm to 200 nm, including any intermediate value and subranges therebetween.

In some embodiments, at least a portion of such particles may aggregate, upon being introduced to the formulation. In some of these embodiments, the aggregate has an average size of no more than 3 microns, or no more than 1.5 micron.

Any commercially available formulations of sub-micron silica particles is usable in the context of the present embodiments, including fumed silica, colloidal silica, precipitated silica, layered silica (e.g., montmorillonite), and aerosol assisted self-assembly of silica particles.

The silica particles can be such that feature a hydrophobic or hydrophilic surface. The hydrophobic or hydrophilic nature of the particles' surface is determined by the nature of the surface groups on the particles.

When the silica is untreated, namely, is composed substantially of Si and O atoms, the particles typically feature silanol (Si—OH) surface groups and are therefore hydrophilic. Untreated (or uncoated) colloidal silica, fumed silica, precipitated silica and layered silica all feature a hydrophilic surface, and are considered hydrophilic silica.

Layered silica may be treated so as to feature long-chain hydrocarbons terminating by quaternary ammonium and/or ammonium as surface groups, and the nature of its surface is determined by the length of the hydrocarbon chains. Hydrophobic silica is a form of silica in which hydrophobic groups are bonded to the particles' surface, and is also referred to as treated silica or functionalized silica (silica reacted with hydrophobic groups).

Silica particles featuring hydrophobic surface groups such as, but not limited to, alkyls, preferably medium to high alkyls of 2 or more carbon atoms in length, preferably of 4 or more, or 6 or more, carbon atoms in length, cycloalkyls, aryl, and other hydrocarbons, as defined herein, or hydrophobic polymers (e.g., polydimethylsiloxane), are particles of hydrophobic silica.

Silica particles as described herein can therefore by untreated (non-functionalized) and as such are hydrophillic particles.

Alternatively, silica particles as described herein can be treated, or functionalized, by being reacted so as to form bonds with the moieties on their surface.

When the moieties are hydrophilic moieties, the functionalized silica particles are hydrophilic.

Silica particles featuring hydrophilic surface groups such as, but not limited to, hydroxy, amine, ammonium, carboxy, silanol, oxo, and the like, are particles of hydrophilic silica.

When the moieties are hydrophobic moieties, as described herein, the functionalized silica particles are hydrophobic.

In some of any of the embodiments described herein, at least a portion, or all, of the silica particles feature a hydrophillic surface (namely, are hydrophillic silica particles, for example, of untreated silica such as colloidal silica).

In some of any of the embodiments described herein, at least a portion, or all, of the silica particles feature a hydrophobic surface (namely, are hydrophobic silica particles).

In some embodiments, the hydrophobic silica particles are functionalized silica particles, namely, particles of silica treated with one or more hydrophobic moieties.

In some of any of the embodiments described herein, at least a portion, or all, of the silica particles are hydrophobic silica particles, functionalized by curable functional groups (particles featuring curable groups on their surface).

The curable functional groups can be any polymerizable group as described herein. In some embodiments, the curable functional groups are polymerizable by the same polymerization reaction as the curable monomers in the formulation, and/or when exposed to the same curing condition as the curable monomers. In some embodiments, the curable groups are (meth)acrylic (acrylic or methacrylic) groups, as defined herein.

Hydrophilic and hydrophobic, functionalized and untreated silica particles as described herein can be commercially available materials or can be prepared using methods well known in the art.

By "at least a portion", as used in the context of these embodiments, it is meant at least 10%, or at least 20%, or at least 30%, or at least 40%, or at least 50%, or at least 60%, or at least 70%, or at least 80%, or at least 90%, or at least 95%, or at least 98%, of the particles.

The silica particles may also be a mixture of two or more types of silica particles, for example, two or more types of any of the silica particles described herein.

In some of any of the embodiments described herein, an amount of the silica particles in a modeling material formulation comprising same ranges from about 1% to about 20%, or from about 1% to about 15%, or from about 1% to about 10%, by weight, of the total weight of the elastomeric formulation.

The amount of the silica particles can be manipulated as desired so as to control the mechanical properties of the cured material. For example, higher amount of silica particles may result in higher elastic modulus of the cured sacrificial structure.

In some of any of the embodiments described herein, an amount of the silica particles is such that a weight ratio of the elastomeric material(s) and the silica particles in the elastomeric formulation ranges from about 50:1 to about 4:1 or from about 30:1 to about 4:1 or from about 20:1 to about 2:1, including any intermediate values and subranges therebetween.

According to some of any of the embodiments described herein, the elastomeric formulation further comprises one or more additional curable material(s).

The additional curable material can be a mono-functional curable material, a multi-functional curable material, or a mixture thereof, and each material can be a monomer, an oligomer or a polymer, or a combination thereof.

Preferably, but not obligatory, the additional curable material is polymerizable when exposed to the same curing energy at which the curable elastomeric material is polymerizable, for example, upon exposure to irradiation (e.g., UV-vis irradiation).

In some embodiments, the additional curable material is such that when hardened, the polymerized material features Tg higher than that of an elastomeric material, for example, a Tg higher than 0° C., or higher than 5° C. or higher than 10° C.

Herein throughout, "Tg" refers to glass transition temperature defined as the location of the local maximum of the E" curve, where E" is the loss modulus of the material as a function of the temperature.

Broadly speaking, as the temperature is raised within a range of temperatures containing the Tg temperature, the state of a material, particularly a polymeric material, gradually changes from a glassy state into a rubbery state.

Herein, "Tg range" is a temperature range at which the E" value is at least half its value (e.g., can be up to its value) at the Tg temperature as defined above.

Without wishing to be bound to any particular theory, it is assumed that the state of a polymeric material gradually changes from the glassy state into the rubbery within the Tg range as defined above. Herein, the term "Tg" refers to any temperature within the Tg range as defined herein.

In some embodiments, the additional curable material is a mono-functional acrylate or methacrylate ((meth)acrylate). Non-limiting examples include isobornyl acrylate (IBOA), isobornylmethacrylate, acryloyl morpholine (ACMO), phenoxyethyl acrylate, marketed by Sartomer Company (USA) under the trade name SR-339, urethane acrylate oligomer such as marketed under the name CN 131B, and any other acrylates and methacrylates usable in AM methodologies.

In some embodiments, the additional curable material is a multi-functional acrylate or methacrylate ((meth)acrylate). Non-limiting examples of multi-functional (meth)acrylates include propoxylated (2) neopentyl glycol diacrylate, marketed by Sartomer Company (USA) under the trade name SR-9003, Ditrimethylolpropane Tetra-acrylate (DiTMPTTA), Pentaerythitol Tetra-acrylate (TETTA), and Dipentaerythitol Penta-acrylate (DiPEP), and an aliphatic urethane diacrylate, for example, such as marketed as Ebecryl 230. Non-limiting examples of multi-functional (meth)acrylate oligomers include ethoxylated or methoxylated polyethylene glycol diacrylate or dimethacrylate, ethoxylated bisphenol A diacrylate, polyethylene glycol-polyethylene glycol urethane diacrylate, a partially acrylated polyol oligomer, polyester-based urethane diacrylates such as marketed as CNN91.

Any other curable material, preferably a curable material featuring, when hardened, a Tg as defined herein, is contemplated.

In some of any of the embodiments described herein, the elastomeric formulation further comprises an initiator, for initiating polymerization of the curable materials.

When all curable materials (elastomeric and additional, if present) are photopolymerizable, a photoinitiator is usable in these embodiments.

Non-limiting examples of suitable photoinitiators include benzophenones (aromatic ketones) such as benzophenone, methyl benzophenone, Michler's ketone and xanthones; acylphosphine oxide type photo-initiators such as 2,4,6-trimethylbenzolydiphenyl phosphine oxide (TMPO), 2,4,6-trimethylbenzoylethoxyphenyl phosphine oxide (TEPO), and bisacylphosphine oxides (BAPO's); benzoins and bezoin alkyl ethers such as benzoin, benzoin methyl ether and benzoin isopropyl ether and the like. Examples of photoinitiators are alpha-amino ketone, bisacylphosphine oxide (BAPO's), and those marketed under the tradename Irgacure®.

A photo-initiator may be used alone or in combination with a co-initiator. Benzophenone is an example of a photoinitiator that requires a second molecule, such as an amine, to produce a free radical. After absorbing radiation, benzophenone reacts with a ternary amine by hydrogen abstraction, to generate an alpha-amino radical which initiates polymerization of acrylates. Non-limiting example of a class of co-initiators are alkanolamines such as triethylamine, methyldiethanolamine and triethanolamine.

A concentration of a photoinitiator in a formulation containing same may range from about 0.1 to about 5 weight percents, or from about 1 to about 5 weight percents, including any intermediate value and subranges therebetween.

According to some of any of the embodiments described herein, the elastomeric formulation further comprises one or more additional, non-curable material, for example, one or more of a colorant, a dispersant, a surfactant, a stabilizer and an inhibitor.

An inhibitor is included in the formulation(s) for preventing or slowing down polymerization and/or curing prior to exposing to the curing condition. Commonly used inhibitors, such as radical inhibitors, are contemplated.

Commonly used surfactants, dispersants, colorants and stabilizers are contemplated. Exemplary concentrations of each component, if present, range from about 0.01 to about 1, or from about 0.01 to about 0.5, or from about 0.01 to about 0.1, weight percents, of the total weight of the formulation containing same.

In some of any of the embodiments described herein, the elastomeric material is a UV curable material, and in some embodiments, it is an elastomeric (meth)acrylate, for example, an elastomeric acrylate.

In some of any of the embodiments described herein, an additional curable component is included in the elastomeric formulation, and in some embodiments, this component is a UV-curable acrylate or methacrylate.

In some of any of the embodiments described herein, the silica particles are (meth)acrylate-functionalized silica particles.

In some of any of the embodiments described herein, the elastomeric formulation comprises one or more mono-functional elastomeric acrylate, one or more multi-functional elastomeric acrylate, one or more mono-functional acrylate or methacrylate and one or more multi-functional acrylate or methacrylate.

In some of these embodiments, the elastomeric formulation further comprises one or more photoinitiators, for example, of the Igracure® family.

In some of any of the embodiments described herein, all curable materials and the silica particles are included in a single formulation.

In some embodiments, silica particles, one or more photointiators, and optionally other components, are included in the elastomeric formulation.

In exemplary formulations according to some of any of the embodiments described herein, all curable materials are (meth)acrylates.

In any of the exemplary formulations described herein, a concentration of a photoinitiator ranges from about 1% to about 5% by weight, or from about 2% to about 5%, or from about 3% to about 5%, or from about 3% to about 4% (e.g., 3, 3.1, 3.2, 3.25, 3.3, 3.4, 3.5, 3.6, 3.7, 3.8, 3.85, 3.9, including any intermediate value therebetween) %, by weight, of the total weight of a formulation comprising same.

In any of the exemplary formulations described herein, a concentration of an inhibitor ranges from 0 to about 2% weight, or from 0 to about 1%, and is, for example, 0, 0.1, 0.2, 0.3, 0.4, 0.5, 0.6, 0.7, 0.8, 0.9 or about 1%, by weight, including any intermediate value therebetween, of the total weight of a formulation comprising same.

In any of the exemplary formulations described herein, a concentration of a surfactant ranges from 0 to about 1% weight, and is, for example, 0, 0.01, 0.05, 0.1, 0.5 or about 1%, by weight, including any intermediate value therebetween, of the total weight of a formulation comprising same.

In any of the exemplary formulations described herein, a concentration of a dispersant ranges from 0 to about 2% weight, and is, for example, 0, 0.1, 0.5, 0.7, 1, 1.2, 1.3, 1.35, 1.4, 1.5, 1.7, 1.8 or about 2%, by weight, including any intermediate value therebetween, of the total weight of a formulation comprising same.

In exemplary formulations according to some of any of the embodiments described herein, a concentration of an elastomeric material ranges from about 30% to about 90% by weight, or from about 40% to about 90%, by weight, or from about 40% to about 85%, by weight.

In some embodiments, the elastomeric material comprises a mono-functional elastomeric material and a multi-functional elastomeric material.

In some embodiments, a concentration of the mono-functional elastomeric material ranges from about 20% to about 70%, or from about 30% to about 50%, by weight, including any intermediate value and subranges therebetween. In exemplary embodiments, a concentration of the mono-functional elastomeric material ranges from about 50% to about 70%, or from about 55% to about 65%, or from about 55% to about 60% (e.g. 58%), by weight, including any intermediate value and subranges therebetween. In exemplary embodiments, a concentration of the mono-functional elastomeric material ranges from about 30% to about 50%, or from about 35% to about 50%, or from about 40% to about 45% (e.g., 42%), by weight, including any intermediate value and subranges therebetween.

In some embodiments, a concentration of the multi-functional elastomeric material ranges from about 10% to about 30%, by weight. In exemplary embodiments, a concentration of the mono-functional elastomeric material ranges from about 10% to about 20%, or from about 10% to about 15% (e.g. 12%), by weight. In exemplary embodiments, a concentration of the mono-functional elastomeric material ranges from about 10% to about 30%, or from about 10% to about 20%, or from about 15% to about 20% (e.g., 16%), by weight.

In exemplary formulations according to some of any of the embodiments described herein, a total concentration of an additional curable material ranges from about 10% to about 40% by weight, or from about 15% to about 35%, by weight, including any intermediate value and subranges therebetween.

In some embodiments, the additional curable material comprises a mono-functional curable material.

In some embodiments, a concentration of the mono-functional additional curable material ranges from about 15% to about 25%, or from about 20% to about 25% (e.g., 21%), by weight, including any intermediate value and subranges therebetween. In exemplary embodiments, a concentration of the mono-functional elastomeric material ranges from about 20% to about 30%, or from about 25% to about 30% (e.g., 28%), by weight, including any intermediate value and subranges therebetween.

In exemplary formulations according to some of any of the embodiments described herein, the elastomeric material comprises a mono-functional elastomeric material and a multi-functional elastomeric material; a concentration of the mono-functional elastomeric material ranges from about 30% to about 50% (e.g., from about 40% to about 45%) or from about 50% to about 70% (e.g., from about 55% to about 60%) by weight; and a concentration of the multi-functional elastomeric material ranges from about 10% to about 20% by weight; and the one or more formulation(s) further comprise(s) an additional mono-functional curable material at a total concentration that ranges from about 20% to about 30%, by weight.

According to some of any of the embodiments described herein, the elastomeric formulation comprises at least one elastomeric mono-functional curable material, at least one elastomeric multi-functional curable material and at least additional mono-functional curable material.

According to some of any of the embodiments described herein, a concentration of the curable mono-functional material ranges from 10% to 30%, by weight of the total weight of the elastomeric formulation.

According to some of any of the embodiments described herein, a concentration of the elastomeric mono-functional curable material ranges from 50% to 70%, by weight, of the total weight of the elastomeric formulation According to some of any of the embodiments described herein, a concentration of the elastomeric multi-functional curable material ranges from 10% to 20%, by weight, of the total weight of the elastomeric formulation According to some of any of the embodiments described herein, a concentration of the curable mono-functional material ranges from 10% to 30%, by weight; a concentration of the elastomeric mono-functional curable material ranges from 50% to 70%, by weight; and a concentration of the elastomeric multi-functional curable material ranges from 10% to 20%, by weight, of the total weight of the elastomeric formulation.

According to some of any of the embodiments described herein, a concentration of the curable mono-functional material ranges from 20% to 30%, by weight, of the total weight of the elastomeric formulation.

According to some of any of the embodiments described herein, a concentration of the elastomeric mono-functional curable material ranges from 30% to 50%, by weight, of the total weight of the elastomeric formulation.

According to some of any of the embodiments described herein, a concentration of the elastomeric multi-functional curable material ranges from 10% to 30%, by weight, of the total weight of the elastomeric formulation.

According to some of any of the embodiments described herein, a concentration of the curable mono-functional material ranges from 20% to 30%, by weight; a concentration of the elastomeric mono-functional curable material ranges from 30% to 50%, by weight; and a concentration of the elastomeric multi-functional curable material ranges from 10% to 30%, by weight, of the total weight of the elastomeric formulation.

In some embodiments, an elastomeric formulation as described herein, is characterized, when hardened, by Tear strength of at least 4,000 N/m, or at least 4500 N/m or at least 5,000 N/m.

In some embodiments, an elastomeric formulation as described herein, is characterized, when hardened, by Tear strength higher by at least 500 N/m, or by at least 700 N/m, or by at least 800 N/m, than that of the formulation devoid of said silica particles, when hardened.

In some embodiments, an elastomeric formulation as described herein, is characterized, when hardened, by Tensile Strength of at least 2 MPa.

In some of any of the embodiments described herein there is provided a kit comprising the elastomeric formulation, as described herein in any of the respective embodiments and any combination thereof.

Herein throughout, the phrases "rubber", "rubbery materials", "elastomeric materials" and "elastomers" are used interchangeably to describe materials featuring characteristics of elastomers. The phrase "rubbery-like material" or "rubber-like material" is used to describe materials featuring characteristics of rubbers, prepared by additive manufacturing (e.g., 3D inkjet printing) rather than conventional processes that involve vulcanization of thermoplastic polymers.

The term "rubbery-like material" is also referred to herein interchangeably as "elastomeric material".

Elastomers, or rubbers, are flexible materials that are characterized by low Tg (e.g., lower than room temperature, preferably lower than 10° C., lower than 0° C. and even lower than −10° C.).

The following describes some of the properties characterizing rubbery (elastomeric) materials, as used herein and in the art.

Shore A Hardness, which is also referred to as Shore hardness or simply as hardness, describes a material's resistance to permanent indentation, defined by type A durometer scale. Shore hardness is typically determined according to ASTM D2240.

Elastic Modulus, which is also referred to as Modulus of Elasticity or as Young's Modulus, or as Tensile modulus, or "E", describes a material's resistance to elastic deformation when a force is applied, or, in other words, as the tendency of an object to deform along an axis when opposing forces are applied along that axis. Elastic modulus is typically measured by a tensile test (e.g., according to ASTM D 624) and is determined by the linear slope of a Stress-Strain curve in the elastic deformation region, wherein Stress is the force causing the deformation divided by the area to which the force is applied and strain is the ratio of the change in some length parameter caused by the deformation to the original value of the length parameter. The stress is proportional to the tensile force on the material and the strain is proportional to its length.

Tensile Strength describes a material's resistance to tension, or, in other words, its capacity to withstand loads tending to elongate, and is defined as the maximum stress in MPa, applied during stretching of an elastomeric composite before its rupture. Tensile strength is typically measured by a tensile test (e.g., according to ASTM D 624) and is determined as the highest point of a Stress-Strain curve, as described herein and in the art.

Elongation is the extension of a uniform section of a material, expressed as percent of the original length, and is typically determined according to ASTM D412.

Z Tensile elongation is the elongation measured as described herein upon printing in Z direction.

Tear resistance describes the maximum force required to tear a material, expressed in units of force per unit length, whereby the force acts substantially parallel to the major axis of the sample. Tear resistance can be measured by the ASTM D 412 method. ASTM D 624 can be used to measure the resistance to the formation of a tear (tear initiation) and the resistance to the expansion of a tear (tear propagation). Typically, a sample is held between two holders and a uniform pulling force is applied until deformation occurs. Tear strength is then calculated by dividing the force applied by the thickness of the material.

Tear resistance under constant elongation describes the time required for a specimen to tear when subjected to constant elongation (lower than elongation at break).

Herein throughout, the phrases "building material formulation", "uncured building material", "uncured building material formulation", "building material" and other variations therefore, collectively describe the materials that are dispensed to sequentially form the layers, as described herein. This phrase encompasses uncured materials dispensed so as to form the object, namely, one or more uncured modeling material formulation(s), and uncured materials dispensed so as to form the support, namely uncured support material formulations.

Herein throughout, the phrase "cured modeling material" or "hardened modeling material" describes the part of the building material that forms the object, as defined herein, upon exposing the dispensed building material to curing, and, optionally, if a support material has been dispensed, also upon removal of the cured support material, as described herein. The cured modeling material can be a single cured material or a mixture of two or more cured materials, depending on the modeling material formulations used in the method, as described herein.

The phrase "cured modeling material" or "cured modeling material formulation" can be regarded as a cured building material wherein the building material consists only of a modeling material formulation (and not of a support material formulation). That is, this phrase refers to the portion of the building material, which is used to provide the final object.

Herein throughout, the phrase "modeling material formulation", which is also referred to herein interchangeably as "modeling formulation", "model formulation" "model material formulation" or simply as "formulation", describes a part or all of the building material which is dispensed so as to form the object, as described herein. The modeling material formulation is an uncured modeling formulation (unless specifically indicated otherwise), which, upon exposure to curing energy, forms the object or a part thereof.

In some embodiments of the present invention, a modeling material formulation is formulated for use in three-dimensional inkjet printing and is able to form a three-dimensional object on its own, i.e., without having to be mixed or combined with any other substance.

An uncured building material can comprise one or more modeling formulations, and can be dispensed such that different parts of the object are made, upon curing, of different cured modeling formulations or different combinations thereof, and hence are made of different cured modeling materials or different mixtures of cured modeling materials.

The formulations forming the building material (modeling material formulations and support material formulations) comprise one or more curable materials, which, when exposed to curing energy, form hardened (cured) material.

Herein throughout, a "curable material" is a compound (typically a monomeric or oligomeric compound, yet optionally a polymeric material) which, when exposed to curing energy, as described herein, solidifies or hardens to form a cured material. Curable materials are typically polymerizable materials, which undergo polymerization and/or cross-linking when exposed to suitable energy source.

The polymerization can be, for example, free-radical polymerization, cationic polymerization or anionic polymerization, and each can be induced when exposed to curing energy such as, for example, radiation, heat, etc., as described herein.

In some of any of the embodiments described herein, a curable material is a photopolymerizable material, which polymerizes and/or undergoes cross-linking upon exposure to radiation, as described herein, and in some embodiments the curable material is a UV-curable material, which polymerizes and/or undergoes cross-linking upon exposure to UV radiation, as described herein.

In some embodiments, a curable material as described herein is a photopolymerizable material that polymerizes via photo-induced free-radical polymerization. Alternatively, the curable material is a photopolymerizable material that polymerizes via photo-induced cationic polymerization.

In some of any of the embodiments described herein, a curable material can be a monomer, an oligomer or a short-chain polymer, each being polymerizable and/or cross-linkable as described herein.

In some of any of the embodiments described herein, when a curable material is exposed to curing energy (e.g., radiation), it hardens (cured) by any one, or combination, of chain elongation and cross-linking.

In some of any of the embodiments described herein, a curable material is a monomer or a mixture of monomers which can form a polymeric material upon a polymerization reaction, when exposed to curing energy at which the polymerization reaction occurs. Such curable materials are also referred to herein as monomeric curable materials.

In some of any of the embodiments described herein, a curable material is an oligomer or a mixture of oligomers which can form a polymeric material upon a polymerization reaction, when exposed to curing energy at which the polymerization reaction occurs. Such curable materials are also referred to herein as oligomeric curable materials.

In some of any of the embodiments described herein, a curable material, whether monomeric or oligomeric, can be a mono-functional curable material or a multi-functional curable material.

Herein, a mono-functional curable material comprises one functional group that can undergo polymerization when exposed to curing energy (e.g., radiation).

A multi-functional curable material comprises two or more, e.g., 2, 3, 4 or more, functional groups that can undergo polymerization when exposed to curing energy. Multi-functional curable materials can be, for example, di-functional, tri-functional or tetra-functional curable materials, which comprise 2, 3 or 4 groups that can undergo polymerization, respectively. The two or more functional groups in a multi-functional curable material are typically linked to one another by a linking moiety, as defined herein. When the linking moiety is an oligomeric or polymeric moiety, the multi-functional group is an oligomeric or polymeric multi-functional curable material. Multi-functional curable materials can undergo polymerization when subjected to curing energy and/or act as cross-linkers.

It is expected that during the life of a patent maturing from this application many relevant building materials for AM will be developed and the scope of the term modeling material and support material is intended to include all such new technologies a priori.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated herein above and as claimed in the claims section below find experimental support in the following examples.

Examples

Reference is now made to the following examples, which together with the above descriptions illustrate some embodiments of the invention in a non limiting fashion.

Figure 7:
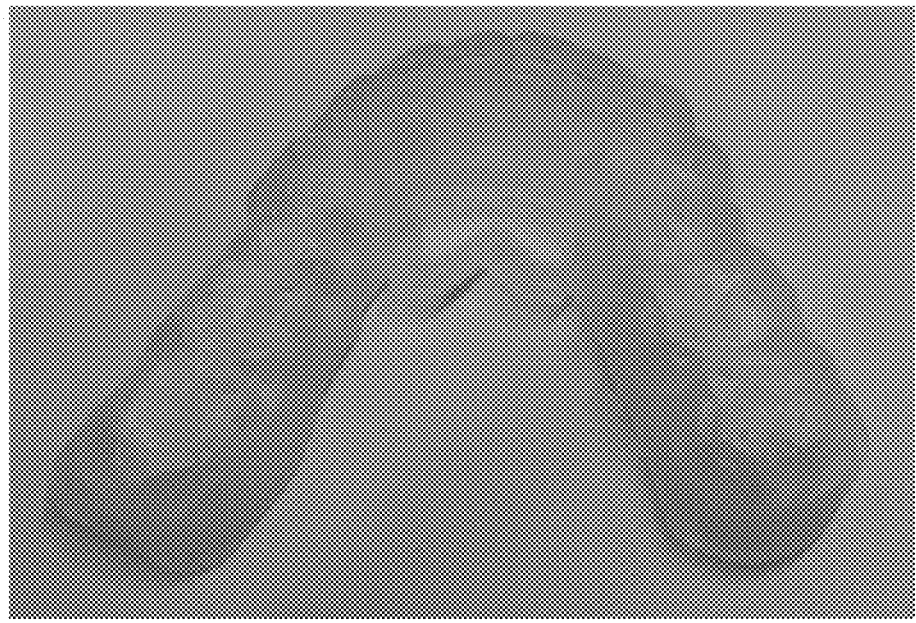
FIG. 7 is an image of a dental structure fabricated in experiments performed according to some embodiments of the present invention.

Experiments were made to determine parameters suitable for ensuring removal of the sacrificial structure by peeling. The manufactured object was a dental structure as shown in the image of FIG. 7. The modeling material was VeroWhitePlus™. The support material was SUP706™. In experiments in which the sacrificial structure was elastomeric, a formulation comprising elastomeric material and silica particles was used as further detailed hereinabove.

Figure 8A:
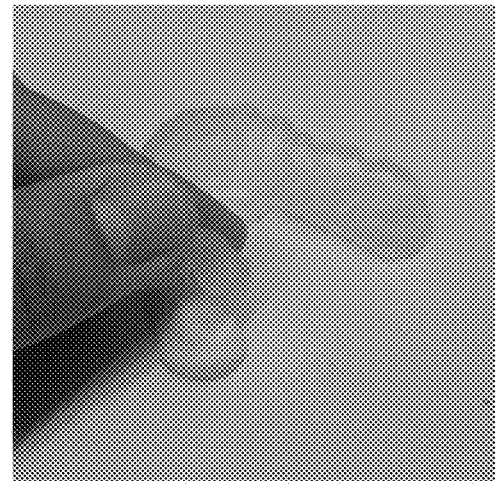
FIGS. 8A-8C are images showing a peeling process of an elastomeric sacrificial structure off the dental structure, according to some embodiments of the present invention.
Figure 8B:
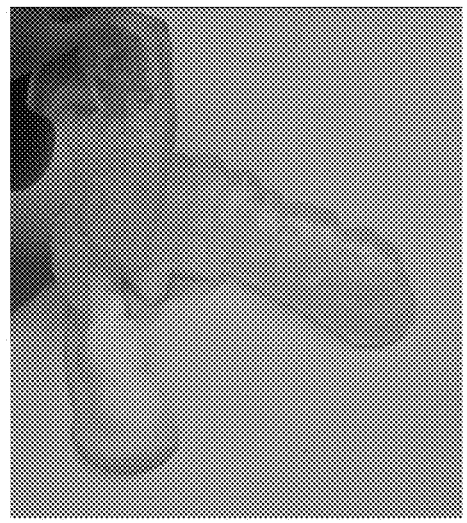
Figure 8C:
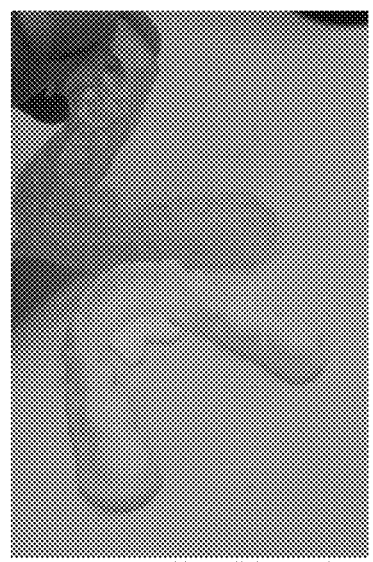

FIGS. 8A-C are images showing the peeling process of an elastomeric sacrificial structure off the dental structure.

Figure 9:
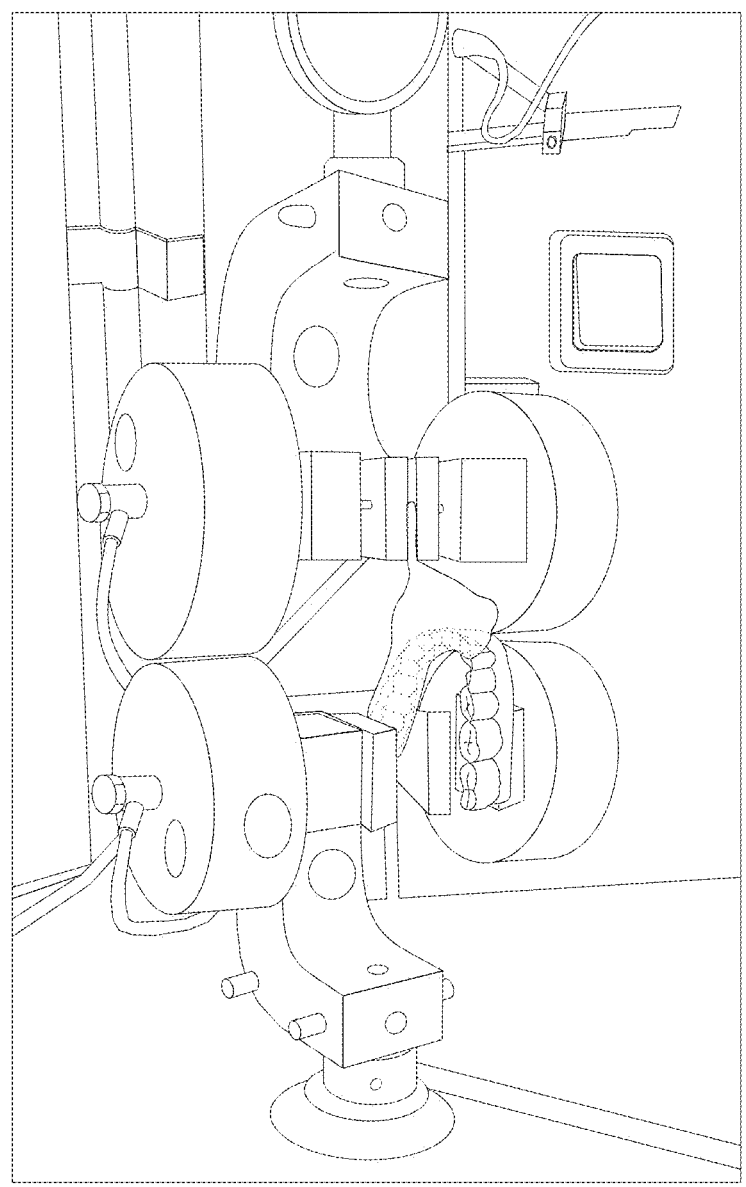
FIG. 9 is an image of an experimental setup designed and constructed to measure the force required to peel the sacrificial structure off the dental structure, according to some embodiments of the present invention.
Figure 10:
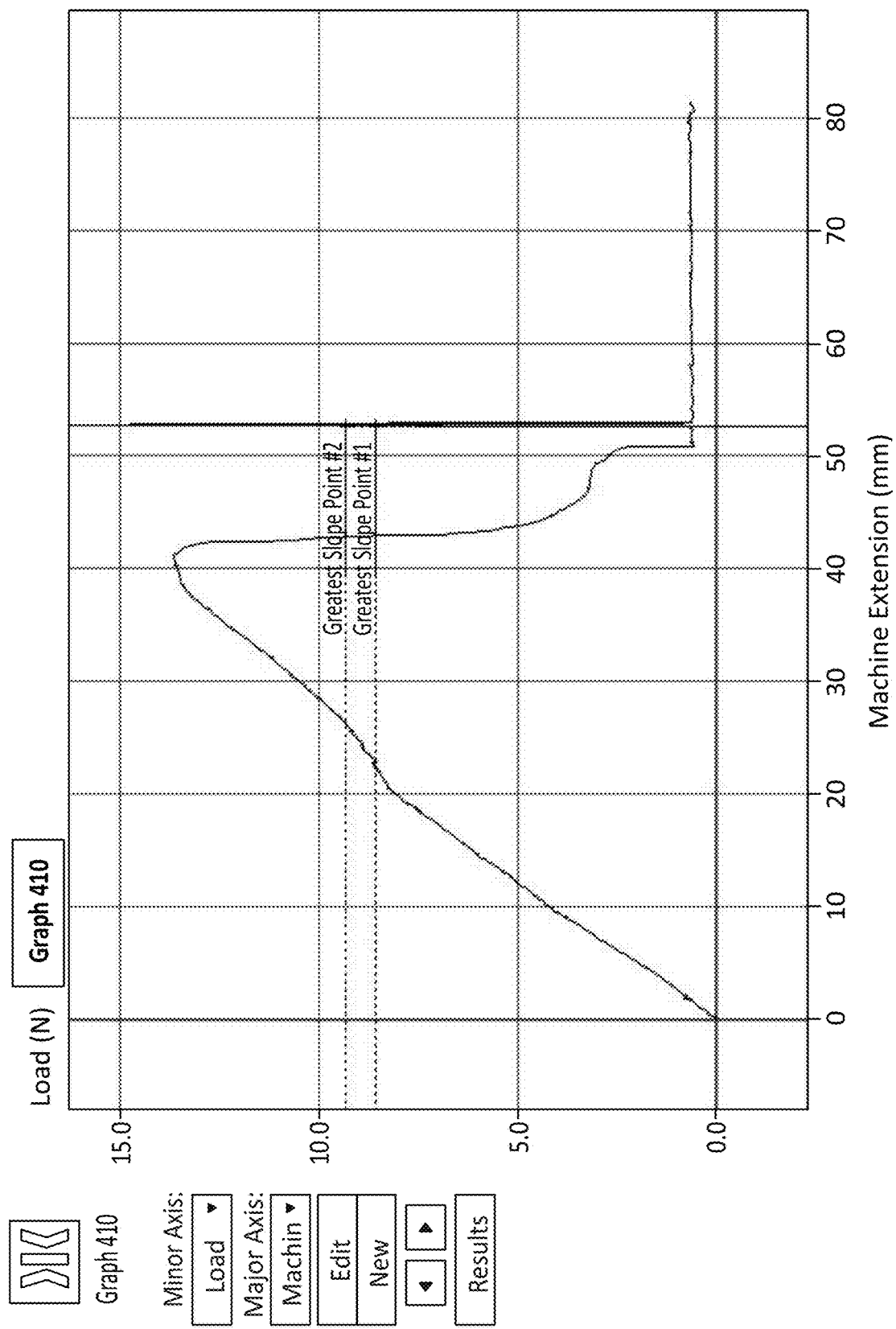
FIG. 10 is a graph showing the results obtained by the experimental setup of FIG. 9.

FIG. 9 is an image of an experimental setup designed and constructed to measure the force required to peel the sacrificial structure off the dental structure. FIG. 10 is a graph showing the results obtained by the experimental setup of FIG. 9. The peeling force curve exhibit a maximal peeling force of about 14N. It is expected that this value depends on the shape of the object.

FIG. 11 is an image showing the peeling process of an interlaced sacrificial structure off the dental structure.

Figure 12:
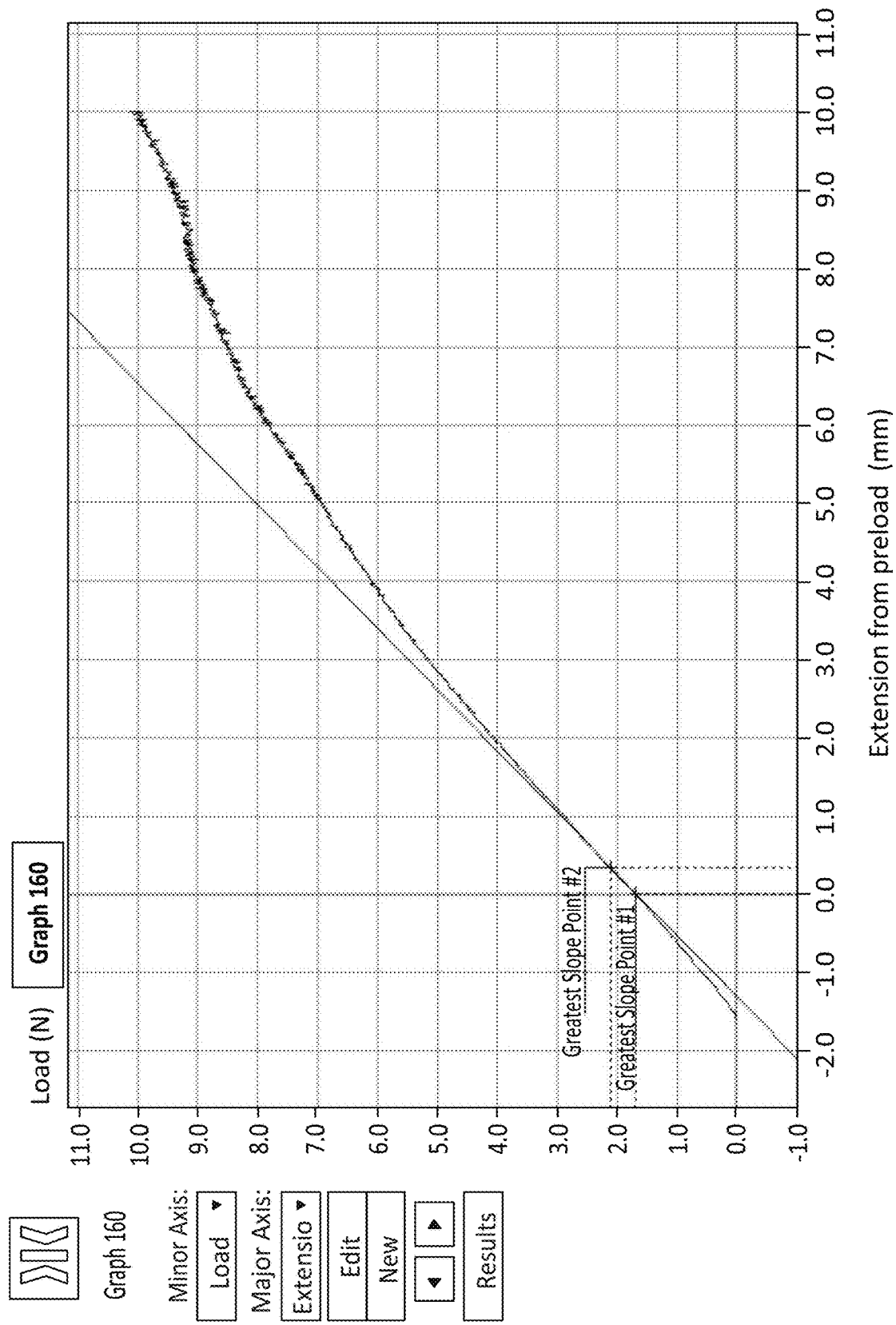
FIG. 12 shows results of a flexural test performed on specimen of interlaced sacrificial structure, according to some embodiments of the present invention.

FIG. 12 shows results of a flexural test performed on specimen of interlaced sacrificial structure. The specimen had a width of 15 mm and a thickness of 1 mm. As shown, at a peeling force of about 5N, a bending of about 3 mm was achieved.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of additive manufacturing of a three-dimensional object, comprising:
   sequentially dispensing and solidifying a plurality of layers comprising (i) a stack of model layers arranged in a configured pattern corresponding to a shape of the object and being made of a modeling material, and (ii) a layered sacrificial structure formed of interlaced slices of support material and modeling material; and
   applying a peeling force to said sacrificial structure to remove said sacrificial structure, and to expose said stack of model layers beneath said sacrificial structure.

2. The method of claim 1, wherein the sacrificial structure is formed by interlacing said support material and modeling material along a build direction of the three-dimensional object.

3. The method of claim 2, wherein the interlacing of said support material and said modeling material is further along a direction perpendicular to the build direction of the three-dimensional object.

4. The method according to claim 1, wherein said modeling material of said stack of model layers and said modeling material of said sacrificial structure are the same modeling material.

5. The method according to claim 1, wherein a plurality of stacks of model layers are dispensed, wherein each stack is arranged in a configured pattern corresponding to a shape of a separate object and being made of a modeling material, thereby forming a plurality of objects on a single receiving surface.

6. The method according to claim 5, wherein said sacrificial structure is dispensed collectively on at least two stacks of model layers such as to form a single peelable sacrificial structure covering said at least two stacks of model layers.

7. The method according to claim 1, wherein said support material is dispensed directly on a tray or a disposable medium placed on said tray, to form a pedestal at least partially coating said tray or a disposable medium, wherein at least a portion of said sacrificial structure is dispensed on said pedestal.

8. The method according to claim 7, wherein said pedestal partially coats said tray or disposable medium, and said stack of model layers is dispensed directly on said tray or disposable medium but not on said pedestal, and wherein said pedestal and said sacrificial structure are selected such that adhesive forces between said sacrificial structure and said stack of model layer are lower than adhesive forces between said stack of model layer and said tray or a disposable medium.

9. The method according to claim 1, wherein said plurality of layers comprises a stack of intermediate layers between said layered sacrificial structure and said stack of model layers.

10. The method according to claim 1, wherein a height of a slice of model material in said sacrificial structure is from about 250 microns to about 4 mm.

11. The method according to claim 1, wherein a slice of support material adjacent said stack of model layers is thicker than any other slice of support material.

12. The method according to claim 1, wherein for at least one of said stack of model layers and said layered sacrificial structure, a flexural modulus of said modeling material is from about 2000 MPa to about 4000 MPa, when measured according to international standard ASTM D-790-04.

13. The method according to claim 1, wherein said stack of model layers fills a cavity partially enclosed by said sacrificial structure.

14. The method according to claim 1, wherein said stack of model layers fills a cavity fully enclosed by said sacrificial structure.

15. The method according to claim 13, further comprising, following said removal of said sacrificial structure, placing a foreign element in said cavity.

16. The method according to claim 1, wherein said stack of model layers is shaped to form an artificial dental structure.

17. The method according to claim 1, wherein said sacrificial structure is characterized, once solidified, by a tear resistance of at least 4 kN per meter, when measured according to international standard ASTM D-624, once solidified.

18. The method according to claim 1, wherein said sacrificial structure is characterized, once solidified, by a tear resistance of from about 4 kN per meter to about 8 kN per meter, when measured according to international standard ASTM D-624.

* * * * *